(12) United States Patent
Boronkay et al.

(10) Patent No.: US 6,937,033 B2
(45) Date of Patent: Aug. 30, 2005

(54) POSITION SENSOR WITH RESISTIVE ELEMENT

(75) Inventors: Allen R. Boronkay, San Jose, CA (US); Bruce M. Schena, Menlo Park, CA (US); Christopher J. Hasser, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 419 days.

(21) Appl. No.: 09/894,985

(22) Filed: Jun. 27, 2001

(65) Prior Publication Data

US 2003/0001592 A1 Jan. 2, 2003

(51) Int. Cl.$^7$ .............................................. G01R 27/08
(52) U.S. Cl. ...................................................... 324/714
(58) Field of Search ................................. 324/662, 678, 324/714, 713, 716, 691, 695, 699

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |

(Continued)

FOREIGN PATENT DOCUMENTS

| | | |
|---|---|---|
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Patrick, "Design, Construction and Testing of a Fingertip Tactile Display for Interaction with Virtual and Remote Environments," *Master of Science Thesis*, MIT. Aug. 1990, archived Nov. 8, 1990.

Calder, "Design of A Force–Feedback Touch–Introducing Actuator For Teleoperator Robot Control." *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical–to–Tactile Image Conversion for the Blind," *IEEE Transactions on Man–Machine Systems*, vol. MMS–11, No. 1, Mar. 1970.

(Continued)

*Primary Examiner*—N. Le
*Assistant Examiner*—Amy He

(57) ABSTRACT

A position sensor includes a resistive element positionable on a first surface. A pair of leads are on the resistive element, the pair of leads adapted to supply a first voltage, such as by being grounded. An intermediate lead is positioned on the resistive element between the pair of leads, the intermediate lead being adapted to provide a second voltage. A contact element is positionable on a second surface, the contact element adapted to contact at least a portion of the resistive element to detect a voltage at a contact position, the detected voltage being related to the position or movement of the second surface relative to the first surface. In another version, a position sensor includes a resistive element comprising first and second resistive strips. A plurality of leads are positioned on each resistive strip to provide a voltage to each resistive strip.

10 Claims, 21 Drawing Sheets

U.S. PATENT DOCUMENTS

| | | | |
|---|---|---|---|
| 4,484,191 | A | 11/1984 | Vavra |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | de Vries et al. |
| 4,713,007 | A | 12/1987 | Alban |
| 4,794,392 | A | 12/1988 | Selinko |
| 4,885,565 | A | 12/1989 | Embach |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,384 | A | 6/1991 | Freels |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,165,897 | A | 11/1992 | Johnson |
| 5,175,459 | A | 12/1992 | Danial et al. |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,283,970 | A | 2/1994 | Aigner |
| 5,299,810 | A | 4/1994 | Pierce et al. |
| 5,309,140 | A | 5/1994 | Everett, Jr. et al. |
| 5,334,027 | A | 8/1994 | Wherlock |
| 5,436,622 | A | 7/1995 | Gutman et al. |
| 5,437,607 | A | 8/1995 | Taylor |
| 5,466,213 | A | 11/1995 | Hogan et al. |
| 5,547,382 | A | 8/1996 | Yamasaki et al. |
| 5,575,761 | A | 11/1996 | Hajianpour |
| 5,690,582 | A | 11/1997 | Ulrich et al. |
| 5,766,016 | A | 6/1998 | Sinclair et al. |
| 5,777,410 | A * | 7/1998 | Asakura et al. ............... 310/71 |
| 5,785,630 | A | 7/1998 | Bobick et al. |
| 6,111,577 | A | 8/2000 | Zilles et al. |
| 6,160,489 | A | 12/2000 | Perry et al. |
| 6,337,678 | B1 * | 1/2002 | Fish ........................... 345/156 |
| 6,347,482 | B1 * | 2/2002 | Takiguchi et al. ............. 49/28 |
| 6,414,607 | B1 * | 7/2002 | Gonring et al. ............... 341/20 |
| 6,422,941 | B1 | 7/2002 | Thorner et al. |

OTHER PUBLICATIONS

Johnson, "Shape–Memory Alloy Tactile Feedback Actuator," *Armstrong Aerospace Medical Research Laboratory*, AAMRL–TR–90–039, Aug. 1990.

Kontarinis et al., "Tactile Display of Vibratory Information in Teleoperation and Virtual Environments," Presence, 4(4):387–402, Harvard Univ., 1995.

Aukstakalnis et al., "Silicon Mirage: The Art and Science of Virtual Reality," ISBN 0–938151–82–7, pp. 129–180, 1992.

Eberhardt et al., "Inducing Dynamic Haptic Perception by The Hand: System Description and Some Results," DSC–vol. 55–1, *Dynamic Systems and Control*: vol. 1, ASME 1994.

Gobel et al., "Tactile Feedback Applied to Computer Mice," *International Journal of Human–Computer Interaction*, vol. 7, No. 1, pp. 1–24, 1995.

Pimentel et al., "Virtual Reality: through the new looking glass," $2^{nd}$ Edition: McGraw–Hill, ISBN 0–07–050167–X, pp. 41–202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low–Cost Force Feedback Joystick and Its Use in the Virtual Reality Environment," *Proceedings of the Third Pacific Conference on Computer Graphics and Applications, Pacific Graphics '95*, Seoul, Korea, Aug. 21–24, 1995.

Kaczmarek et al., "Tactile Displays," *Virtual Environment Technologies*, Chap. 9, pp. 349–414.

Lake, "Cyberman from Logictech," at http://www.ibibllo.org/GamesBytes/Issue21/greviews/cyberman.html, 1994.

Yamakita et al., "Tele–Virtual Reality of Dynamic Mechanical Model," *Proceedings of the 1992 IEEE/RSJ International Conference on Intelligent Robots and Systems*, Raleigh, NC, Jul. 7–10, 1992.

Noll, "Man–Machine Tactile," *SID Journal*, Jul./Aug. 1972 issue.

Rosenberg, "Virtual Fixtures: Perceptual Overlays Enhance Operator Performance in Telepresence Tasks," *Ph.D. Dissertation*, Stanford University, Jun. 1994.

Zilles, "A Constraint–Based God–Object Method for Haptic Display," Department of Mechanical Engineering, Artificial Intelligence Laboratory, Massachusetts Institute of Technology, undated.

* cited by examiner

POSITION SENSOR WITH RESISTIVE ELEMENT

BACKGROUND

The present invention relates to position sensing.

A position sensor may be used to detect the linear displacement and/or angular rotation of moving objects and components in a variety of applications. For example, a position sensor may be provided to detect the movement of a human or a human body part. In one application, sensed human movement may be used to make diagnostic and/or anatomical determinations, such as by being used to study a human's range of motion or a human's kinesthetic activities. In another application, the movements of the human may be used to control the operation of a device or process. For example, a position sensor may be used in a computer interface device to detect a user's manipulation of the device. The detected manipulation may then be used to provide input to a computer system to control computer-generated objects and environments, to control physical objects, and/or to instruct the computer to perform tasks. In one application, a user interacts with a computer-generated environment, such as a game, a surgical simulation, a graphical user interface, or other environment generated in response to an application program, by manipulating an object such as a mouse, joystick, trackball, gamepad, rotary knob, three dimensionally translatable object, or the like, to control a graphical image, such as a cursor, within a graphical environment or to otherwise control the operation of the computer. In another application, the sensed motion of a master device may be used to control the movement and positioning of a slave device.

Conventional position sensors often either have relatively low resolution or are relatively expensive to manufacture. For example, a conventional analog potentiometer is inexpensive, but often has a linearity that varies by over 5%. Thus, the potentiometer offers poor accuracy when used for large ranges of motion detection without detailed calibration. Optical encoders, which operate by alternately allowing and preventing an emitted beam to be detected by a detector, have resolutions limited by the spacing of encoder divisions. The higher the resolution, the more closely spaced the encoder divisions must be. However, as the encoder division spacing is reduced below about 2 mm, the costs associated with the encoder wheel or bar, the illumination, the detectors, and the alignment features increases above that which is acceptable for mass production of low cost products. To gain a higher sensing resolution and to allow for the direction of movement to the determined, quadrature is often provided by using two detectors, which are 90 degrees out of phase with one another. This allows one detector to sense a threshold amount of light before the other detector when the slotted member is moved and causes the other detector to provide a detection signal out of phase with the first detector, thereby increasing the resolution since additional position detections are made, and allowing for the determination of the direction of movement by comparing the detected signals. Even higher resolution can be provided by interpolation between the slots. However, high resolution encoders are often too costly to implement in low-cost, high-volume consumer products. Alternatively, magnetic encoders, which count magnetic domains of opposite polarity, and electrical encoders, which count alternating strips of conductive and insulating material, may be used instead of the optical encoder, but these also have the resolution and costs issues of the optical encoder.

Thus, it is desirable to provide a position sensor which may be manufactured for a relatively low cost and/or which has a relatively high resolution. It is further desirable to provide a position sensor that may be used to improve the performance and/or lower the cost of a computer interface device.

SUMMARY

The present invention satisfies these needs. In one aspect of the invention, a position sensor comprises a resistive element positionable on a first surface; a pair of leads on the resistive element, the pair of leads adapted to supply a first voltage; an intermediate lead on the resistive element between the pair of leads, the intermediate lead adapted to provide a second voltage; and a contact element positionable on a second surface, the contact element adapted to contact at least a portion of the resistive element to detect a voltage at a contact position, the detected voltage being related to the position or movement of the second surface relative to the first surface.

In another aspect of the invention, a position sensor comprises a resistive element positionable on a first surface, the resistive element comprising first and second resistive strips; a plurality of leads on each resistive strip to provide a voltage to each resistive strip; and a contact element positionable on a second surface, the contact element adapted to contact at least a portion of the resistive element to detect a voltage at a contact position, the detected voltage being related to the position or movement of the second surface relative to the first surface.

In another aspect of the invention, a position sensor comprises a resistive element positionable on a first surface, the resistive element comprising a plurality of portions; a plurality of leads adapted to provide a voltage to the resistive element; a contact element positionable on a second surface, the contact element adapted to contact the resistive element to detect a voltage at a contact position, the detected voltage being related to the position or movement of the second surface relative to the first surface; and a voltage controller adapted to selectively provide a voltage to the portions of the resistive element in relation to the position of the contact element relative to the resistive element.

In another aspect of the invention, a position sensor comprises a resistive element positionable on a first surface; a pair of leads on the resistive element, the pair of leads adapted to supply a first voltage; a contact element positionable on a second surface, the contact element adapted to contact at least a portion of the resistive element and to provide a second voltage to the resistive element; and an intermediate lead on the resistive element between the pair of leads, the intermediate lead adapted to detect a voltage, the detected voltage being related to the position or movement of the second surface relative to the first surface.

In another aspect of the invention, an interface device is provided for interfacing a user with a computer, the computer running an application program and generating a graphical image and a graphical object. The interface device comprises a user manipulatable object in communication with the computer; and a sensor comprising a resistive element on a first surface and a contact element on a second surface, the resistive element comprising a plurality of leads adapted to provide a first voltage and a plurality of leads adapted to provide a second voltage, whereby the contact element contacts at least a portion of the resistive element to detect a voltage at a contact position, the detected voltage being related to the manipulation of the user manipulatable object and usable to control the graphical object.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to position sensing, such as the detection of linear position or angular rotation of an object relative to another object. Although illustrated at least partly in the context of user interface devices, the present invention can be used in other applications and should not be limited to the examples provided herein.

Figure 1:
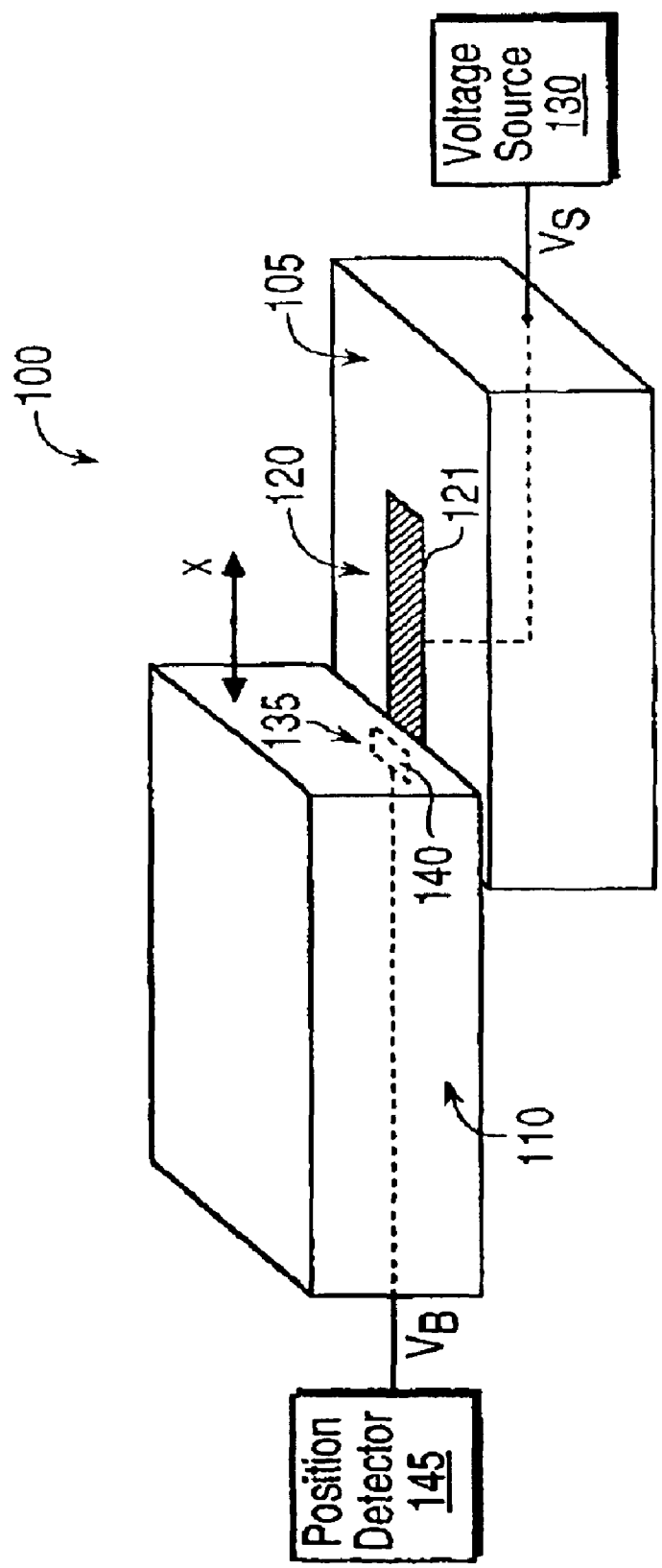
FIG. 1 is a schematic perspective view of a position sensor comprising a resistive element according to the present invention.

FIG. 1 is a schematic view of a position sensor 100 according to the present invention. The position sensor 100 is capable of detecting a relative or absolute position of a first surface 105 with respect to a second surface 110. In the version shown in FIG. 1, the first surface 105 is linearly displaceable relative to the second surface 110. A resistive element 120 comprises resistive material 121 which may be in the form of one or more resistive strips positioned on or in the first surface 105. By resistive strip it is meant a substantially continuous area of resistive material 121. The resistive material 121 may comprise, for example, one or more of resistive ink, metallic oxide, metallic oxide with glass, cermet, metal foil, metal wire windings, conductive plastic, and the like, and may have an electrical resistance of from about 5 Ohms to about 10 MOhms, more preferably from about 100 Ohms to about 1 MOhm, and most preferably from about 10 kOhms to about 50 kOhms. In the version shown in FIG. 1, a voltage source 130 supplies a voltage to the resistive element 120 so that the voltage varies along the length of the resistive element 120. A contact element 135 is positioned on or in the second surface 110 to contact, or otherwise electrically engage, the resistive element 120. For example, the contact element 135 may comprise one or more brushes 140, or the like, comprising conductive material, such as one or more of copper, silver, bronze, gold, brass, and the like, or semiconducting material. The voltage at a contact position on the resistive element 120 is applied to the brush 140 as the brush 140 moves across the resistive element 120. This brush voltage, $V_B$, is provided to a position detector 145 which comprises circuitry capable of receiving the brush voltage, $V_B$, and generating an output signal indicative of the relative positions of the first and second surfaces 105, 110.

Figure 2:
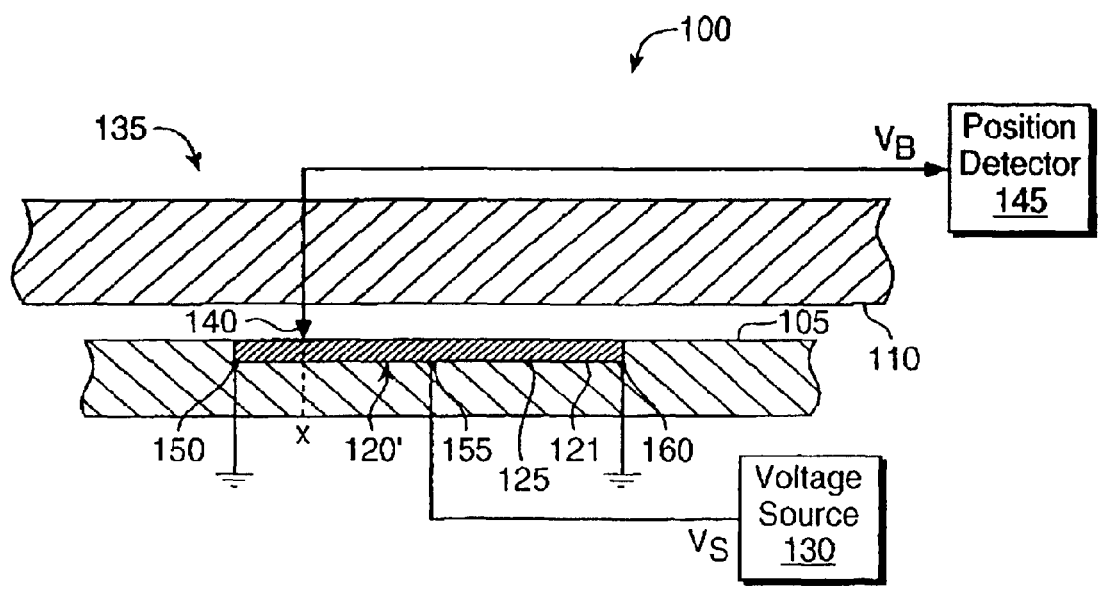
FIG. 2 is a schematic sectional side view of a version of a position sensor comprising a resistive element having a plurality of electrical leads.
Figure 2A:
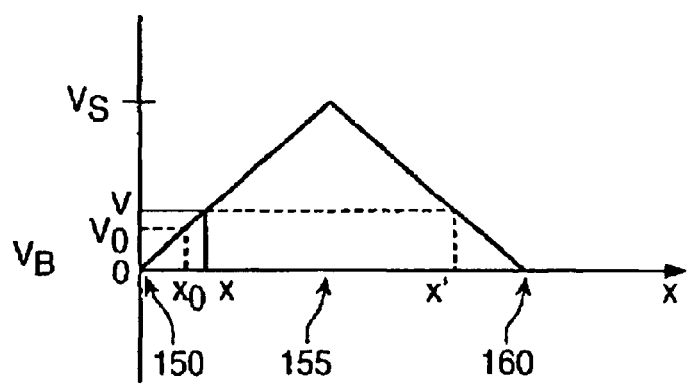
FIG. 2a is a graph showing a voltage profile for the position sensor of FIG. 2.

FIG. 2 shows a longitudinal cross-section through a position sensor 100 including a version of the resistive element 120' which comprises a resistive strip 125 having a plurality of electrical leads 150, 155, 160. By lead it is meant any electrical conductor connected to the resistive element or any site on the resistive element adapted to be contacted by an electrical conductor. In the version shown, end leads 150, 160 are located at or near the respective ends of a resistive strip 125, or at or near ends of a section or portion of a resistive strip 125. The end leads 150, 160 supply the resistive strip 125 with a first voltage. One or more intermediate leads 155 supply the resistive strip 125 with a second voltage. For example, the end leads 150, 160 may connect the ends of the resistive strip 125 to ground with the ends of the resistive strip 125 having a voltage substantially equal to zero. The intermediate lead 155 may be connected to the voltage source 130 and thereby apply a voltage to the resistive strip substantially equal to the voltage, $V_S$, from the voltage source 130. The brush 140 of the contact element 135 contacts the resistive element 120 at a position along its length, for example at position x shown in FIG. 2, so that a voltage may be applied from the resistive element 120' to the brush 140. This brush voltage, $V_B$, varies according to the position of the brush 140 along the resistive element 120', as shown in the FIG. 2A. As can be seen, when the brush is located at the position of a first end lead 150, the voltage applied to the brush 140 is substantially the voltage applied to the first end lead 150, which in the version of FIG. 2A is substantially zero. As the brush moves along the resistive strip 125, the voltage increases until the brush is located at a position where the voltage from the voltage source 130 is supplied. The voltage then decreases as the brush 140 continues toward the position of the second end lead 160 and where the resistive strip 125 is again grounded.

The position detector 145 monitors the brush voltage, $V_B$, to determine the position of the second surface 110 relative to the first surface 105. For example, when the brush 140 is at position x, a voltage v will be applied to the brush 140, as shown in FIG. 2A. The position detector 145 receives the signal indicating that the brush voltage, $V_B$, equals v and determines that the second surface is at position x. As can be seen from FIG. 2A, the brush voltage, $V_B$, is equal to v at two locations, x and x'. The position detector 145 comprises circuitry and/or logic that allows the position to be unambiguously determined. For example, in one version, the position determination is performed incrementally where a change in brush voltage, $V_B$, represents a change in position. This is illustrated in FIG. 2A, where a previous position, $x_0$, is registered in the position detector 145. The next measured brush voltage, $V_B$, is determined to be v. The difference between the voltages $(v-v_0)$ is used to determine the change in position, and the position is determined to be the nearest position associated with that change of brush voltage. Accordingly, x is determined to be the position instead of x'. Since the time between movement from $x_0$ to x is known, the velocity of the surface movement can also be determined. This method of position and/or velocity detection is particularly useful when the sampling rate is sufficiently high, relative to the rate of movement of the second surface 110 with respect to the first surface 105, to prevent inaccurate position determinations and when the direction of movement is known. Alternatively or additionally, a supplemental position sensor may be provided to aid in the determination of the relative positions of the surfaces, as will be discussed.

Figure 3:
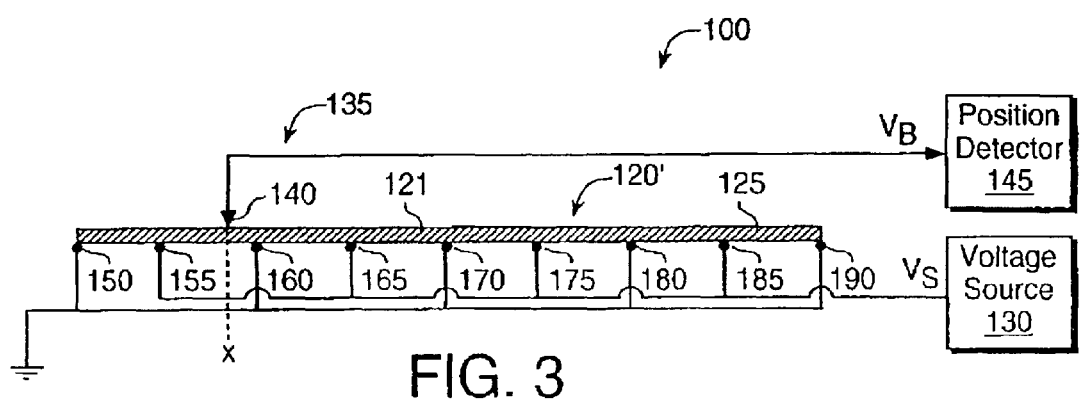
FIG. 3 is a schematic side view of a resistive element having a plurality of grounded leads and a plurality of intermediate leads.
Figure 3A:
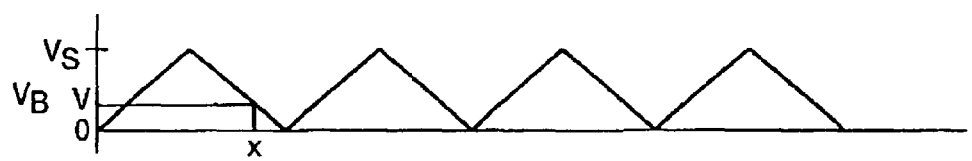
FIG. 3a is a graph showing a voltage profile for a position sensor using the resistive element of FIG. 3.

The position sensor 100 of FIG. 2 is advantageous over conventional position sensors. For example, the position sensor 100 comprising a resistive element 120' having an intermediately applied voltage has a higher resolution than a potentiometer which is grounded at one end and has a voltage applied to its other end. In addition, the position sensor 100 can include additional voltage inputs to provide high resolution position sensing over a larger range of positions. For example, as shown in FIG. 3, the position sensor 100 may comprise three or more grounded leads, such as the five grounded leads 150, 160, 170, 180, 190 shown, and two or more intermediate leads, such as the four intermediate leads 155, 165, 175, 185 shown, which are connected to the voltage source 130. The brush voltage, $V_B$, as a function of position of the brush 140 on the resistive element 120' is shown in FIG. 3A. The position x can be determined when the brush voltage, $V_B$, is detected to be v. The ambiguity can be resolved by high sampling rate incremental position detection or with a supplemental position detector, as discussed above.

Figure 4:
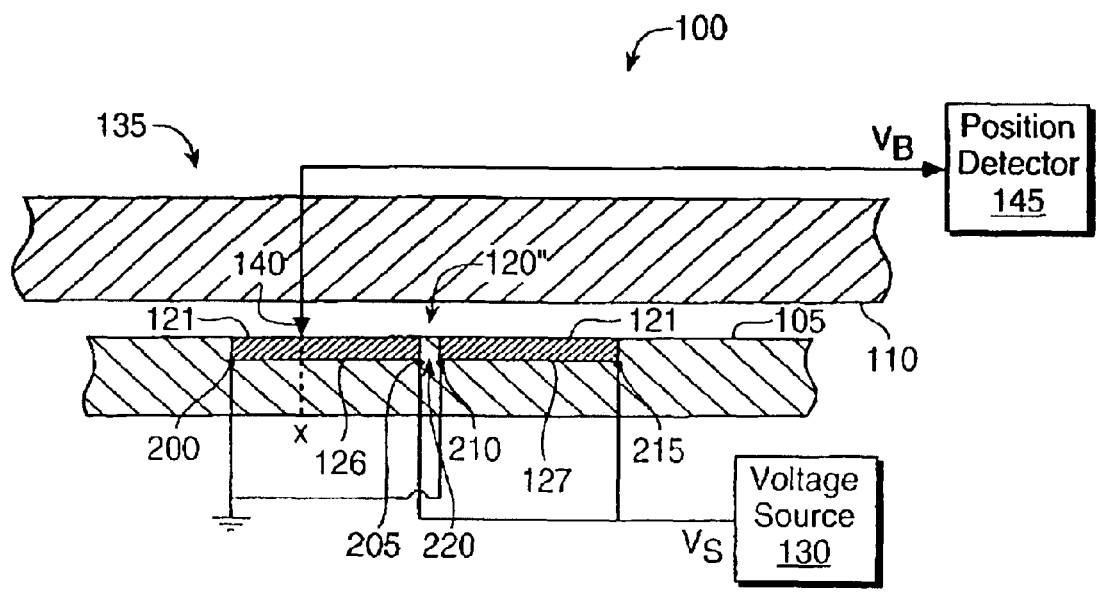
FIG. 4 is a schematic sectional side view of a position sensor having a resistive element comprising a plurality of resistive strips.
Figure 4A:
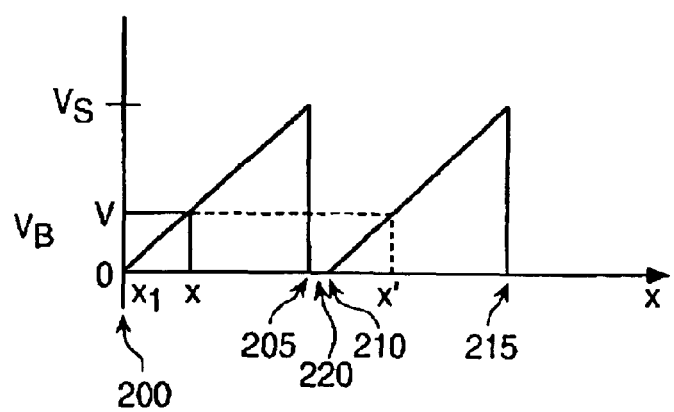
FIG. 4a is a graph showing a voltage profile for the position sensor of FIG. 4.

In another version, the position sensor 100 comprises a version of the resistive element 120" comprising a plurality of resistive strips each with a plurality of leads, as shown in FIG. 4. The resistive element 120" of this version comprises a first resistive strip 126 and a second resistive strip 127 each including a first lead 200, 210 at first ends of respective resistive strips and a second lead 205, 215 at second ends of the resistive strips. The first leads 200, 210 supply a first voltage, such as by being connected to ground, and the second leads 205, 215 provide a second voltage, such as $V_S$ from voltage source 130. Between the resistive strips 126, 127 is a non-conducting portion 220 that is less conductive than the resistive material 121. Accordingly, the brush voltage $V_B$ as a function of the position of the brush 140 is shown in FIG. 4A. The ambiguity may be resolved as discussed above. The version of FIG. 4 is advantageous in that the distance between x and x' is substantially constant along the length of the resistive element 120", except within the region of the non-conducting portion 220. Thus, the resolution for a particular rate of relative movement of the surfaces can be easily determined, and for relatively low rates of movement, the resolution is substantially limited only by the thickness of the non-conductive portion 220.

The non-conducting portion 220 is sufficiently thick to substantially prevent the voltage applied to an end of a first resistive strip 126 from affecting the voltage applied to the second resistive strip 127. The non-conducting portion 220 may be provided by providing a gap between resistive portions. In one version, the non-conducting portion 220 may comprises one or more insulating or dielectric materials, such as a rubber, a plastic, a glass, or wood. For example, the non-conducting portion 220 may comprises an insulating fluoropolymer, such as PTFE. The non-conducting portion 220 is sufficiently thin to provide an acceptable sensor resolution and sufficiently thick to prevent undesirable voltage from passing from one resistive portion to another. Thus, for highly insulating non-conductive portions, an acceptable thickness can be less than an acceptable thickness for a less insulating non-conductive portions. The acceptable thickness is dependent on selected materials and design requirements. It may also be advantageous to provide an insulating material at the non-conductive portion to reduce bumps and surface irregularities that could add wear on the brush and reduce the life of the brush.

The position sensors 110 of FIGS. 3 and 4 may also be used to determine an absolute position of the first surface 105 relative to the second surface 110. For example, the position detector 145 may comprise a cycle counter to allow for the absolute position sensing. The cycle counter may be designed to recognize and count cycles through which the brush 140 has passed. The cycle counter may comprise a peak detector or may recognize other distinguishing features of a cycle. Thus, when it has been recognized that the brush 140 of FIG. 3, for example, has passed into its third cycle, the position detector 145 would register the coarse position of the brush 140 to be between leads 170 and 180. The brush voltage $V_B$ would then be used to determine the precise position within the coarse position range. To allow for the cycle counter to be used to detect absolute position when the first surface 105 and second surface 110 are relatively movable in opposite directions, such as in the positive and negative x directions, supplemental information may be provided to the position detector 145 to allow for the cycle counting, as will be discussed.

The position sensor 100 may comprise additional features in order to improve the position sensing abilities of the sensor. For example, the second surface 110 may comprise two or more contact elements 135, such as a first brush 141 and a second brush 142, that are fixedly spaced relative to one another. The position detector 145 detects a first brush voltage, $V_{B1}$, and a second brush voltage, $V_{B2}$. The voltages from the first brush 141 and the second brush 142 may be used to determine absolute position of the surfaces, to improve resolution, and/or to provide quadrature or the like to the position sensing.

Figure 5:
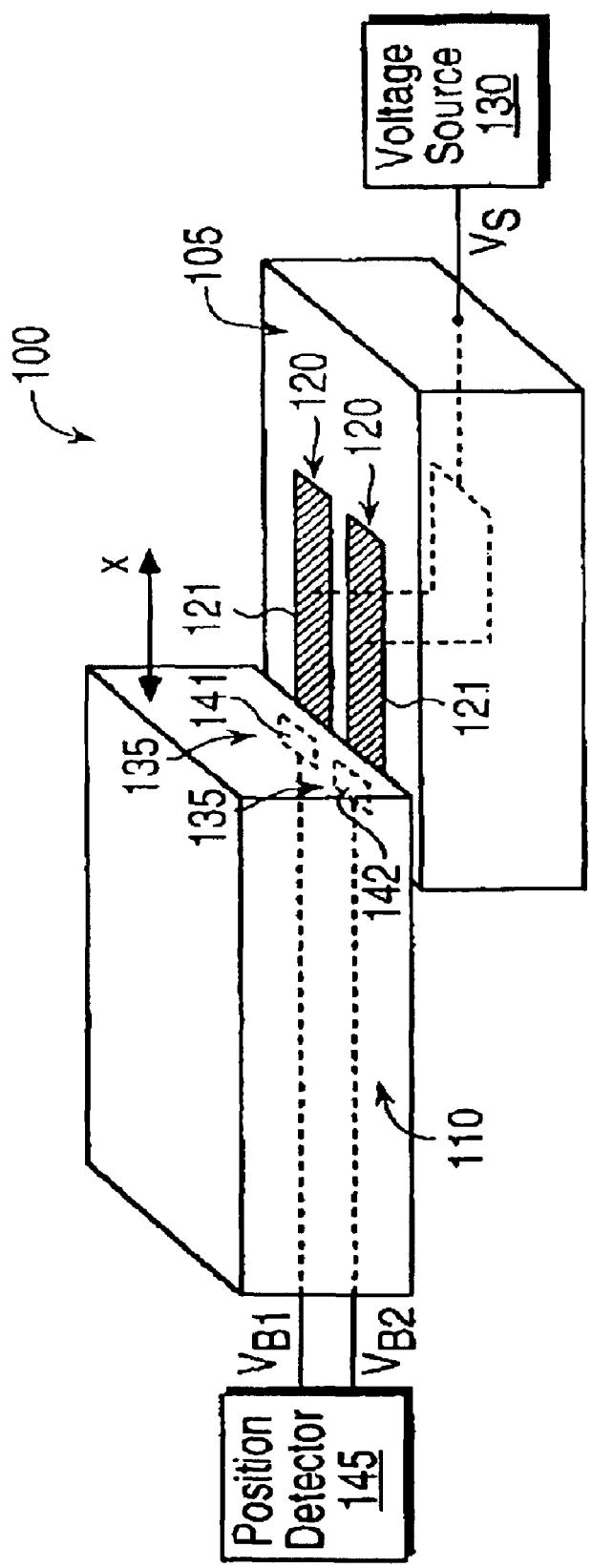
FIG. 5 is a schematic perspective view of a position sensor having a plurality of resistive elements.

FIG. 5 shows one version of a position sensor 100 comprising a plurality of brushes. In this version, two laterally spaced resistive elements 120 are provided. A first brush 141 contacts a first resistive element 120 and a second brush 142 contacts a second resistive element 120. The voltage source 130 applies a voltage, $V_S$, to the first resistive elements 120 in a manner that allows for improved position sensing. In another version, separate voltage sources may be provided for each resistive element 120.

Figure 6:
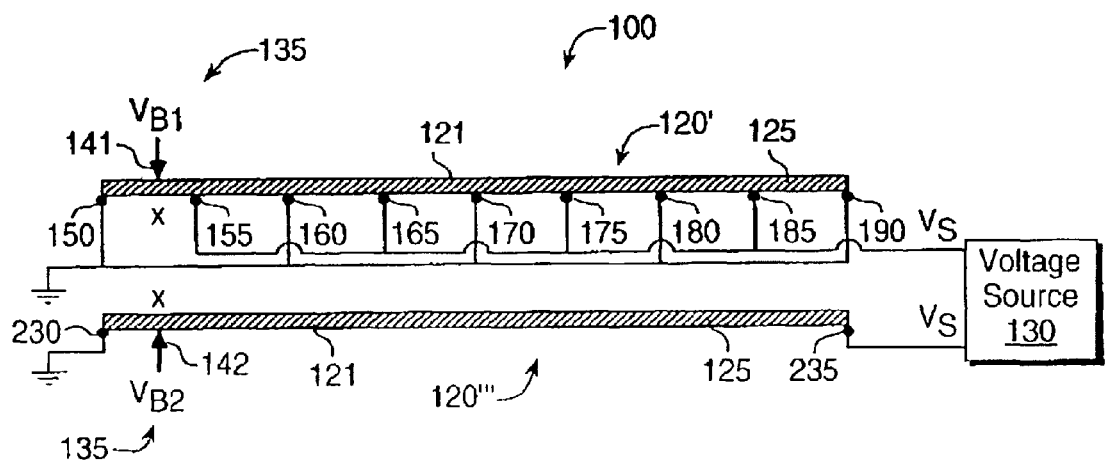
FIG. 6 is a schematic view of a portion of a position sensor having a plurality of resistive elements.
Figure 6A:
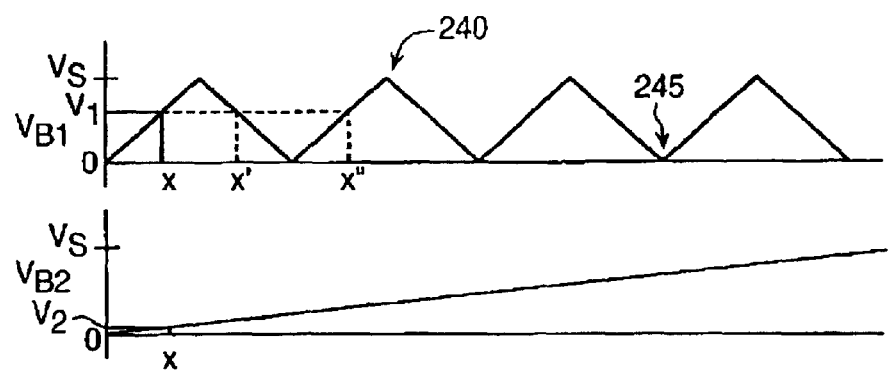
FIG. 6a is a graph showing a voltage profile for the position sensor of FIG. 6.
Figure 7:
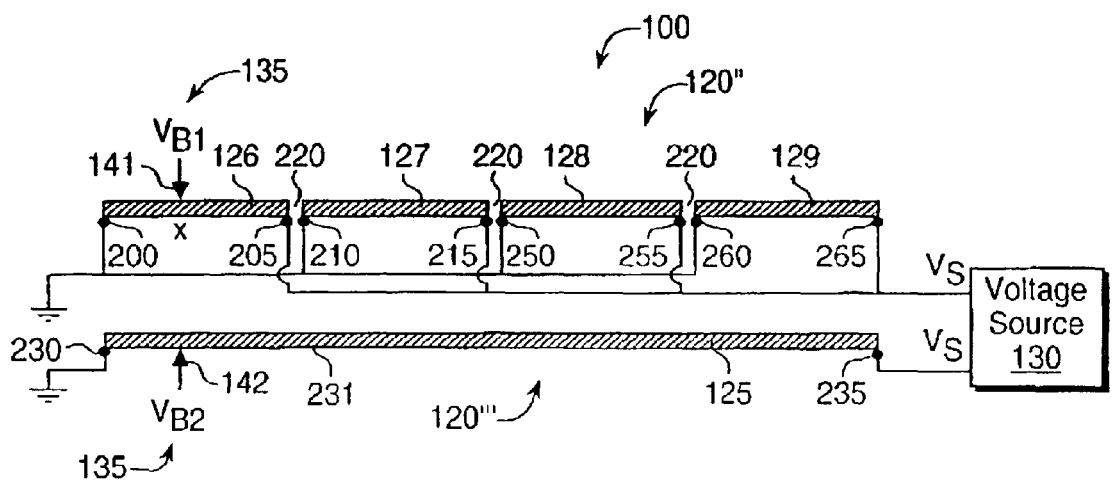
FIG. 7 is a schematic view of a portion of another version of a position sensor having a plurality of resistive elements.

In one version, the additional resistive element may be provided to allow for absolute position sensing, as shown for example in the embodiments of FIG. 6 and 7. In the version shown in FIG. 6, the position sensor 100 comprises a resistive element 120' similar to the resistive element of FIG. 3 and a resistive element 120''' comprising a resistive strip 125 with a grounded lead 230 at one end and a $V_S$ supplied lead 235 at its other end. FIG. 6A shows the first brush voltage, $V_{B1}$, as a function of position, and the second brush voltage, $V_{B2}$, as a function of position. The first brush 141 contacts the resistive element 120' and the second brush 142 contacts the resistive element 120''' at positions corresponding to position x, providing a first brush voltage of $v_1$ and a second brush voltage of $v_2$. The resistive element 120' which has more $V_s$ supplying leads, has a higher resolution than the resistive element 120''' having only one $V_s$ supplying lead 235. However, the resistive element 120''' with fewer $V_s$ supplying leads has less ambiguity in that there is a single position x associated with a detected second brush voltage $V_{B2}$. As a result, the second brush voltage $V_{B2}$ may be used to provide the coarse position, and the first brush voltage $V_{B1}$ may be used to determine the fine position. Thus, the $V_{B2}$ signal may be used to resolve the ambiguity created by the $V_{B1}$ signal, in that it is unclear if the detected voltage $v_1$ relates to a position x, x', x", etc. For example, in one version, the position detector 145 may select the position to be the x value corresponding to $v_1$ that is the closest to the x value determined from the $V_{B2}$ signal. Together, the two detected signals may be used to determine a high resolution absolute position of the first and second surfaces 105, 110. Alternatively, the resistive element 120''' may comprise more than one $V_s$ supplying lead, but fewer than the number of $V_s$ supplying leads than the other resistive element 120'.

Figure 7A:
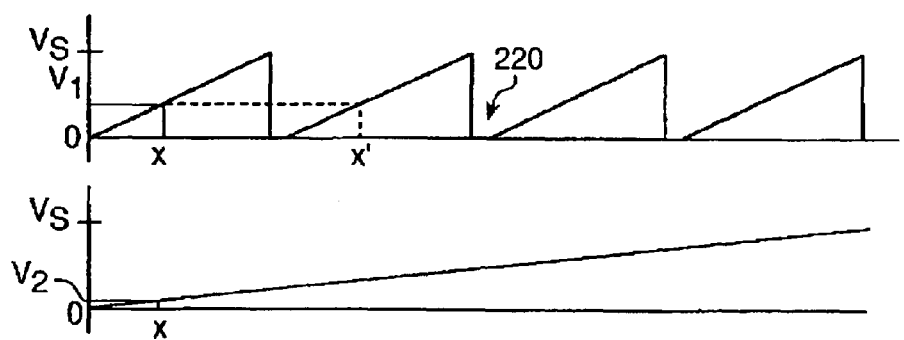
FIG. 7a is a graph showing a voltage profile for the position sensor of FIG. 7.

In the version of FIG. 7, a coarse position determining resistive element 120''' is used with a resistive element 120'' comprising a plurality of resistive strips 126, 127, 128, 129, like the resistive element 120'' of FIG. 4. First ends of the resistive strips 126, 127, 128, 129 comprise grounded leads 200, 210, 250, 260 and second ends comprise leads 205, 215, 255, 265 which are connected to the voltage source 130. The coarse position determining resistive element 120''' is similar to the resistive element 120''' in the version of FIG. 6. Thus, in the version of FIG. 7, the second brush voltage $V_{B2}$ is again used to determine a coarse position and the first brush voltage $V_{B1}$ is used to finely resolve the position, as shown in FIG. 7A.

The versions of FIGS. 6 and 7 may have resolution capabilities that vary across the sensor 100. For example, the resolution of the version of FIG. 6 is limited primarily to the resolution near the peaks 240 and valleys 245 of the $V_{B1}$ signal, as shown in FIG. 6A. At the peaks 240 and valleys 245, the positions of x and x' become increasingly close. When the distance between x and x' is less than the resolution of the resistive element 120''', an ambiguity may exist over these peak and valley portions. In addition, the actual peak and/or valley may be rounded due to the thickness of the lead attachment in some instances. Thus, it may be difficult to determine if a measured voltage, $v_1$, should be associated with x or with x', and the sensor may have regions of high resolution and regions of less high resolution. In contrast, the distance from x to x' in the version of FIG. 7 is substantially constant. Thus, if the resolution of the coarse position determining resistive element 120''' is higher than the distance from x to x', the resolution of the position sensor 100 of the version of FIG. 7 is limited primarily by the thickness of the non-conductive portion 220. Since the portions where resolution is limited is known for each of the versions, supplemental position determination can be made at those versions. Alternatively, no supplemental determination may be provided and the overall resolution can be considered to be the resolution at these less resolute areas. Alternatively, the position detector 145 may use logic to determine when the determined position is known to be at a first resolution and when the determined position is known to be at a second resolution.

Figure 8:
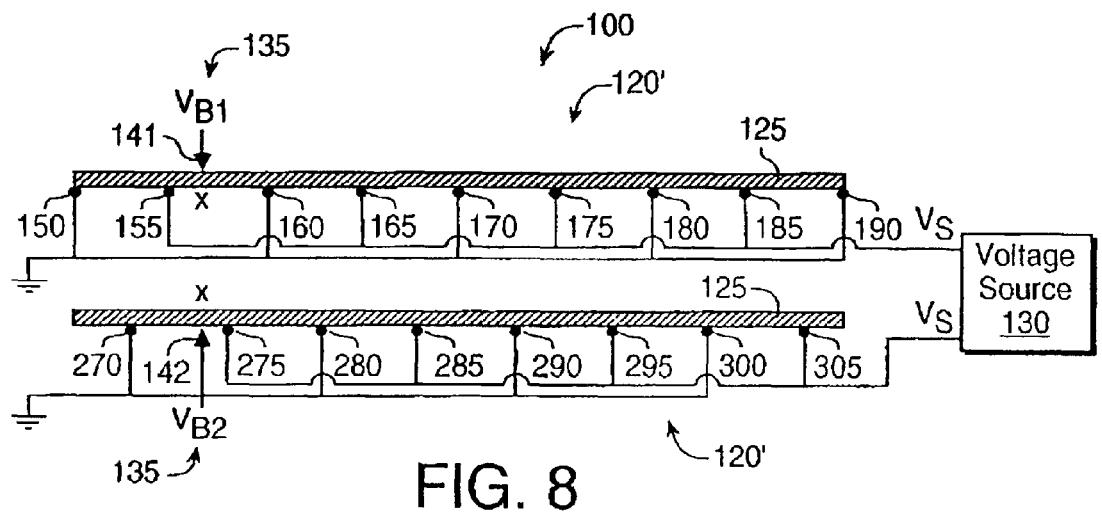
FIG. 8 is a schematic view of a portion of another version of a position sensor having a plurality of resistive elements.
Figure 8A:
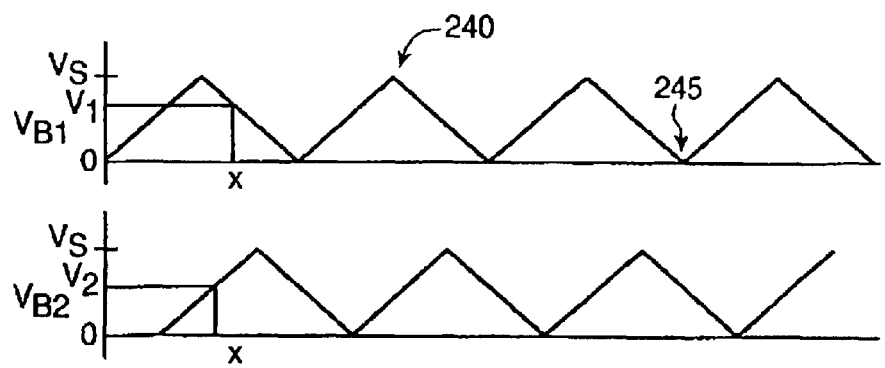
FIG. 8a is a graph showing a voltage profile for the position sensor of FIG. 8.

FIG. 8 shows another version of a position sensor 100 of the type shown in FIG. 5. In this version, the position sensor 100 comprises two resistive elements 120' similar to the resistive element 120' of FIGS. 2 and 3 where each resistive element 120' comprises a resistive strip with three or more leads. One resistive element 120' comprises leads 150, 160, 170, 180, 190 connected to ground and leads 155, 165, 175, 185 supplying a voltage $V_s$ to the resistive strip 125. The other resistive element 120' comprises grounded leads 270, 280, 290, 300 offset from the grounded leads in the first resistive element 120' and with voltage supplying leads 275, 285, 295, 305 offset from the voltage supplying leads in the first resistive element 120'. For example, by shifting the leads of the resistive elements so that the respective $V_{B1}$ and $V_{B2}$ cycles are out of phase of one another, for example by being 90 degrees out of phase as shown in FIG. 8A, quadrature can be provided. For every position in a cycle there is a unique combination of values of $V_{B1}$ and $V_{B2}$. Accordingly, the direction of movement can be determined by the position detector 145. In addition, resolution may be increased since a signal at a peak 240 or a valley 245 may be supplemented by the other signal, which is not at a peak 240 or valley 245 as can be seen from FIG. 8A. In an advanced version, the position detector 145 may place more weight on the signal that is not at a peak 240 or valley 245 thereby further improving resolution.

Figure 9:
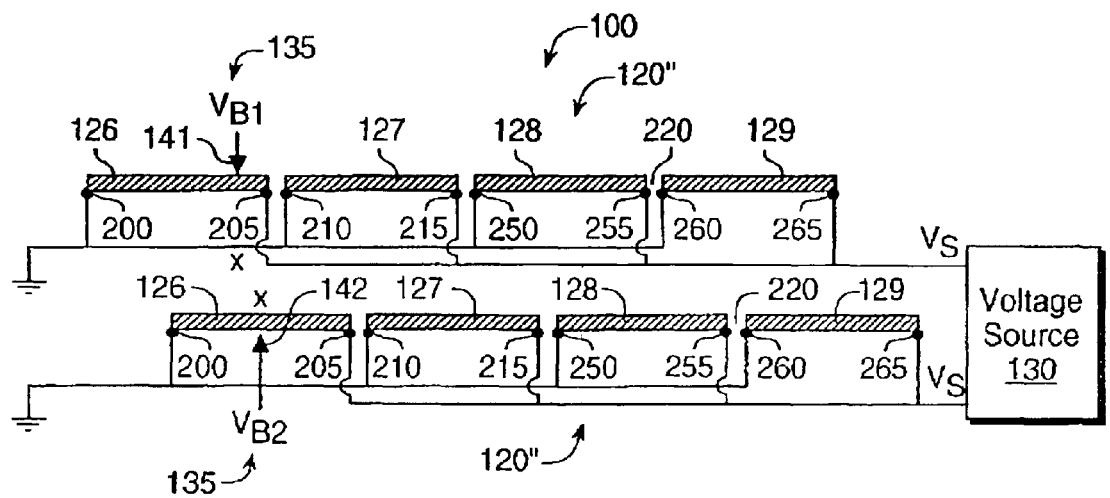
FIG. 9 is a schematic view of a portion of another version of a position sensor having a plurality of resistive elements.
Figure 9A:
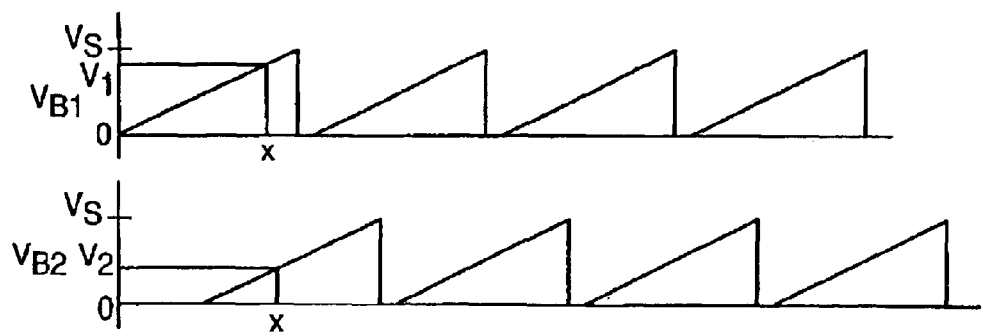
FIG. 9a is a graph showing a voltage profile for the position sensor of FIG. 9.

Another version of the invention of FIG. 5 is shown in FIG. 9. In this version, the position sensor 100 comprises two resistive elements 120" similar to the resistive element 120" of FIG. 4. Each resistive element 120" comprises a plurality of resistive strips 126, 127, 128, 129 separated by non-conductive portions 220. The resistive strips 126, 127, 128, 129 of the two resistive elements 120" are offset relative to the first resistive strip 126 so that the non-conductive portions 220 do not overlap one another. The resulting voltage profile is shown in FIG. 9A. This version has an improved resolution in that the effects of the non-conductive portion 220 can be compensated. For example, when the first brush voltage $V_{B1}$ is detected to be at or near zero, the second brush voltage $V_{B2}$ can be primarily used in making the position determination. Similarly, when the second brush voltage $V_{B2}$ is at or near zero, the first brush voltage $V_{B1}$ can be used. In this way, the signal that is primarily be used for making the determination is the signal that is in the linear section of its voltage profile and is thus the most accurate.

Figure 10:
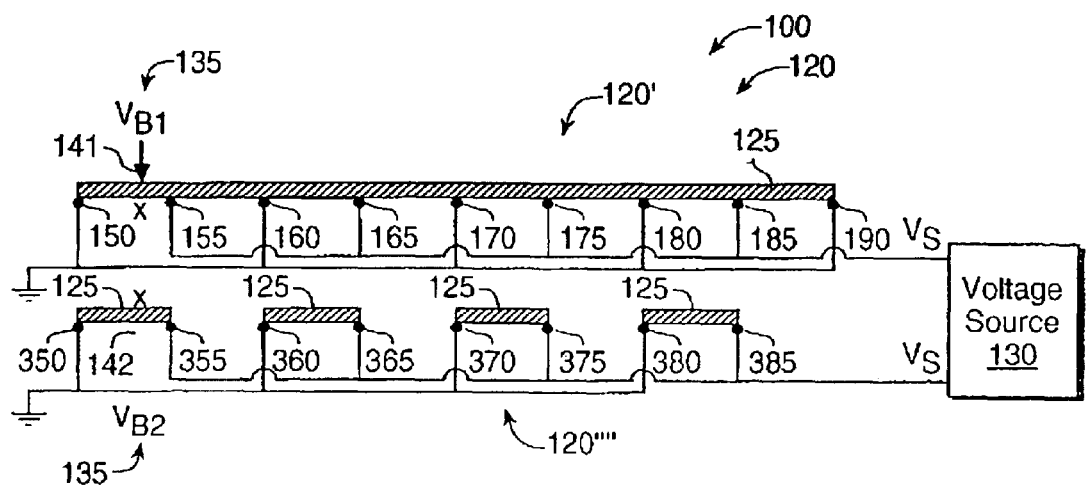
FIG. 10 is a schematic view of a portion of another version of a position sensor having a plurality of resistive elements.
Figure 10A:
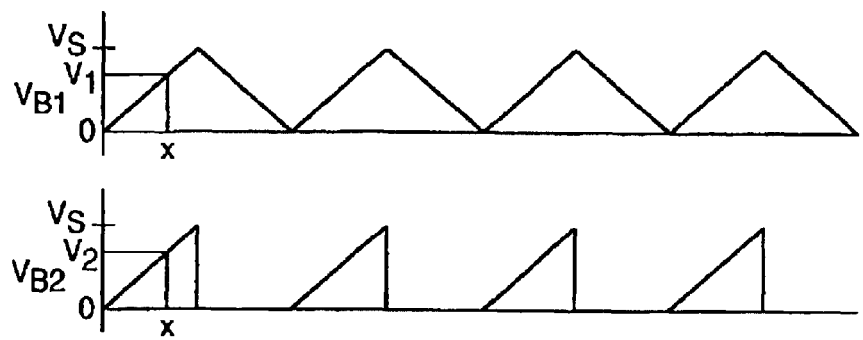
FIG. 10a is a graph showing a voltage profile for the position sensor of FIG. 10.
Figure 11:
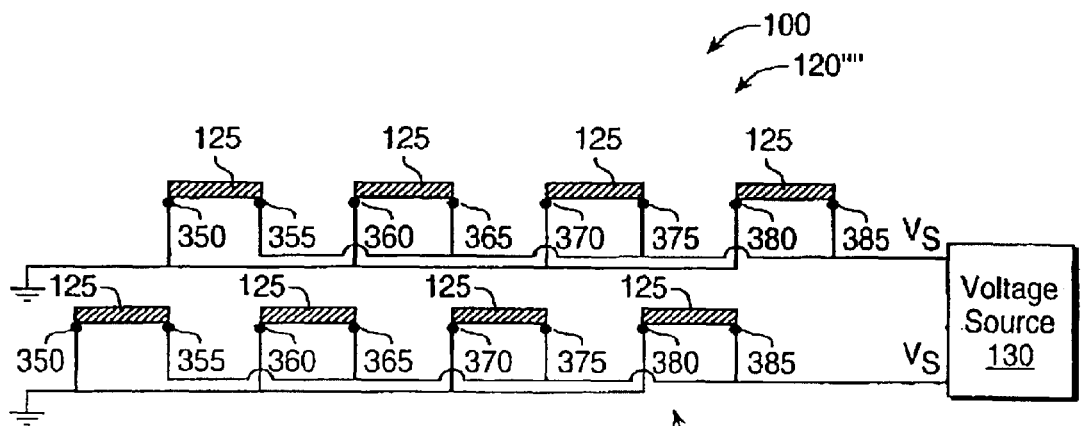
FIG. 11 is a schematic view of a portion of another version of a position sensor having a plurality of resistive elements.
Figure 12:
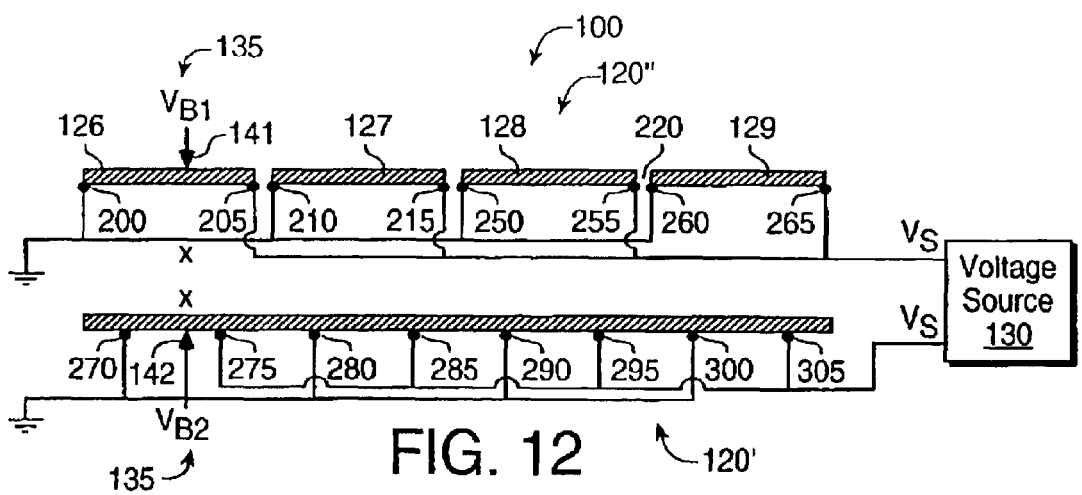
FIG. 12 is a schematic view of a portion of another version of a position sensor having a plurality of resistive elements.
Figure 12A:
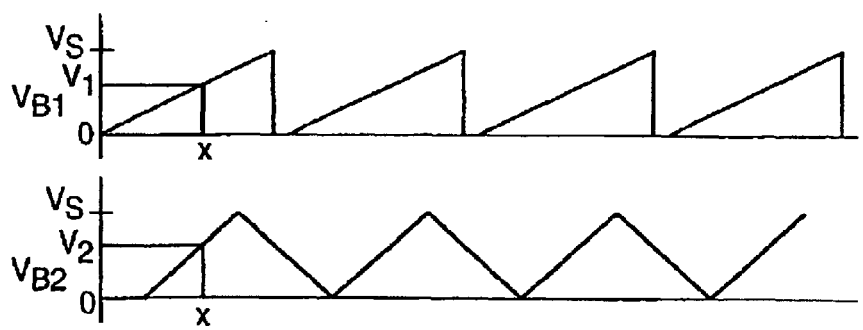
FIG. 12a is a graph showing a voltage profile for the position sensor of FIG. 12.

FIGS. 10, 11, and 12 show alternative versions of position sensors 100 comprising two resistive elements 120. In the version of FIG. 10, the position sensor 100 comprises a resistive element 120' like the one of FIGS. 2 and 3 where the resistive element 120' comprises a resistive strip 125 having alternating grounded and voltage supplying leads. The position sensor also comprises a resistive element 120'''' comprising a plurality of spaced resistive strips 125 each comprising a grounded lead 350, 360, 370, 380 and a voltage supplying lead 355, 365, 375, 385. In one version, the length of the resistive strips 125 in the resistive element 120'''' is about half the length of a cycle in the resistive element 120', as shown in FIG. 10. The resulting first brush voltage and second brush voltage profiles are shown in FIG. 10A. The position detector 145 may examine the second brush voltage $V_{B2}$ to aid in the position determination. For example, a non-zero voltage on the second brush 142 may indicate to the position detector 145 that the detected first brush voltage $V_{B1}$ corresponds to the positive slope portion of the cycle of the voltage profile, thereby reducing ambiguities. Additionally or alternatively, the second brush voltage $V_{B2}$ could be used by a cycle counter to allow for an absolute position determination. In another version, the resistive strips 125 in the resistive element 120'''' may be more numerous and more closely spaced to provide for encoder-like position detection. In another version, as shown in FIG. 11, the position sensor 100 comprises two resistive elements 120'''' like the second resistive element 120'''' in FIG. 10. Each resistive element 120'''' comprises a series of longitudinally spaced resistive strips 125. In the version shown, when one of the brush voltages is substantially zero, the other brush voltage is used for the position determination. The position sensor 100 in the version of FIG. 12 comprises a resistive element 120" like the resistive element 120" in the version of FIG. 4 and a resistive element 120' like the resistive element 120' in the version of FIGS. 2 and 3. The resulting voltage profiles, as shown in FIG. 12A, may be used for increased resolution during position detection, for quadrature-type determinations, and/or for absolute position detection. Other hybrid variations of the above described sensor arrangements may also be used. In addition, three or more resistive strip versions with a corresponding number of contact elements may also be used.

Figure 13:
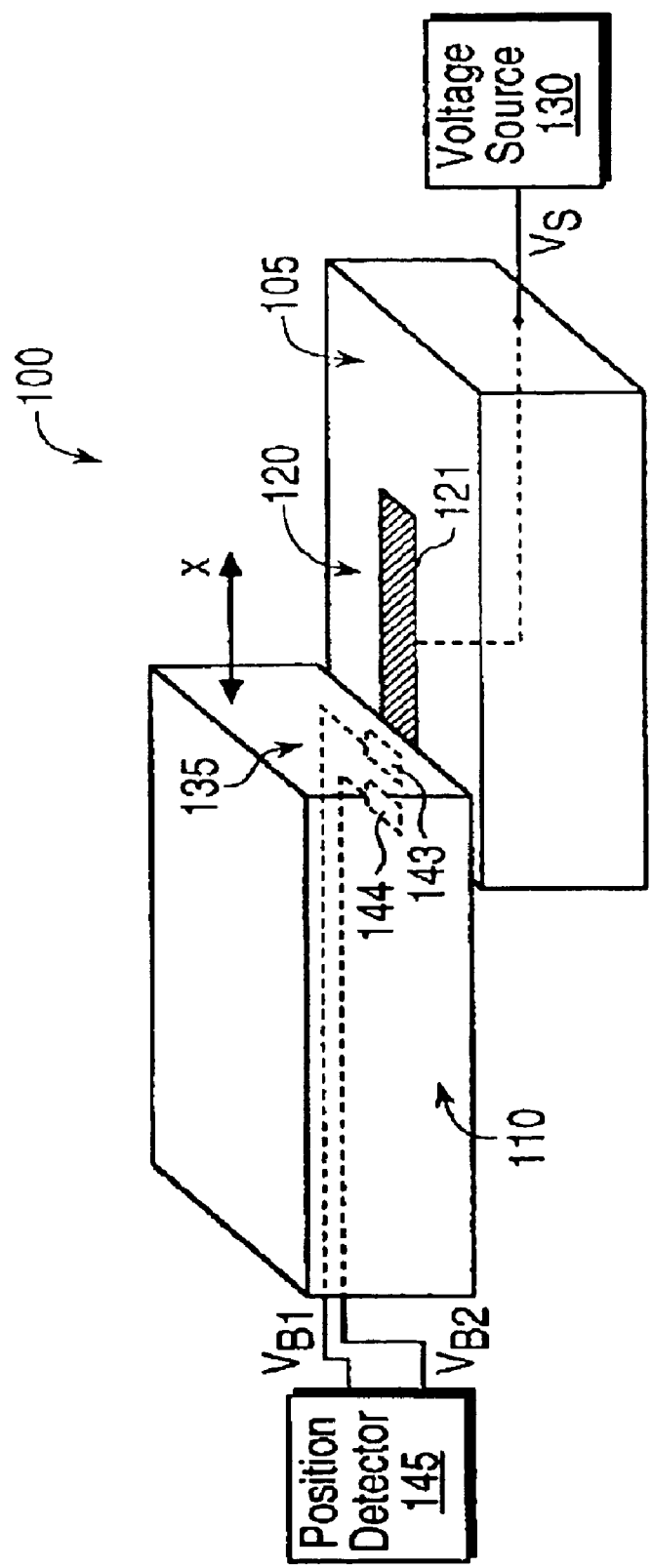
FIG. 13 is a schematic perspective view of a position sensor having a plurality of contact brushes.
Figure 14:
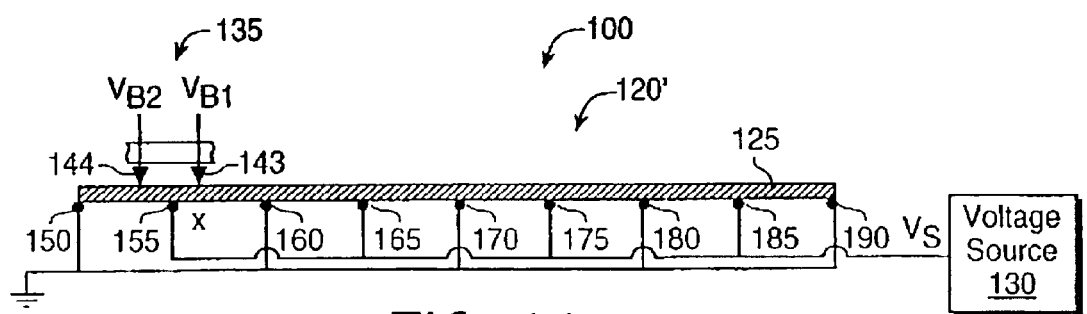
FIG. 14 is a schematic view of a position sensor having a plurality of contact brushes.
Figure 14A:
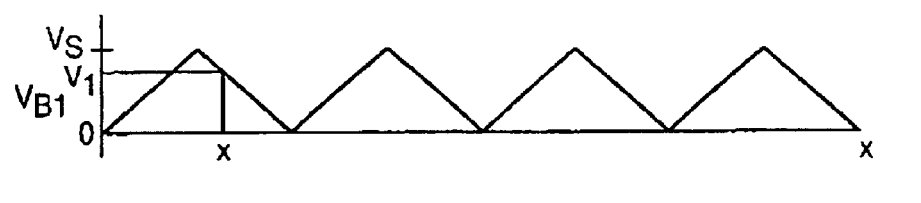
FIG. 14a is a graph showing a voltage profile for the position sensor of FIG. 14.
Figure 14A:
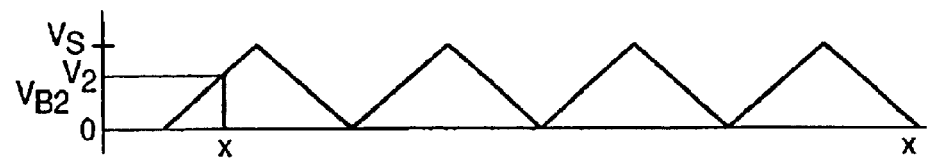
Figure 15:
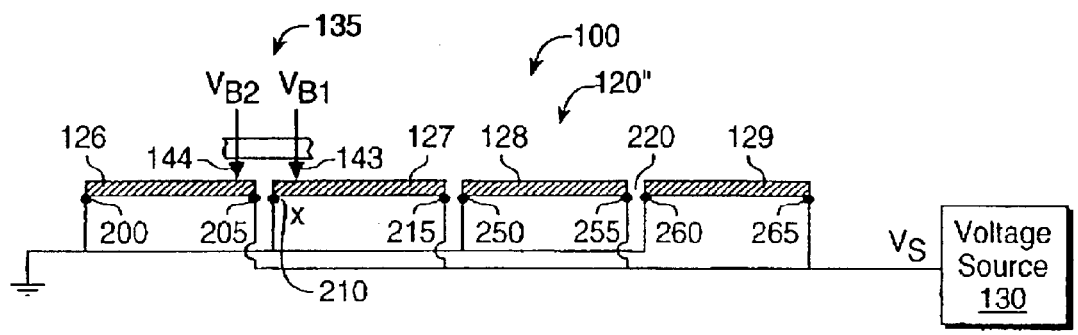
FIG. 15 is a schematic view of another version of a position sensor having a plurality of contact brushes.
Figure 15A:
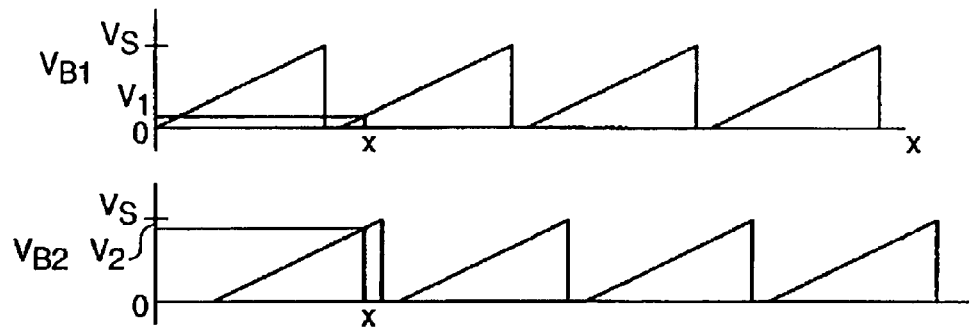
FIG. 15a is a graph showing a voltage profile for the position sensor of FIG. 15.

In another version, supplemental position information can be obtained without having to provide a second resistive element 120. For example, in the version of FIG. 13, the contact element 135 comprises a first brush 143 and a second brush 144 longitudinally spaced from the first brush 143. Each brush contacts, or otherwise engages, the resistive element 120. FIGS. 14 and 15 show versions of the position sensor 100 comprising longitudinally spaced brushes. In FIG. 14, the resistive element 120' is like the resistive element 120' in FIGS. 2 and 3. In FIG. 15, the resistive element 120" is like the resistive element 120" in FIG. 4. In the versions shown, the second brush 144 contacts the resistive element 120', 120" at a position producing a $V_{B2}$ profile 90 degrees out of phase with the $V_{B1}$ profile, as shown in FIGS. 14A and 15A. Accordingly, the $V_{B1}$ and $V_{B2}$ voltage profiles for the version of FIG. 14 are substantially the same as the voltage profiles for the version of FIG. 8, and the $V_{B1}$ and $V_{B2}$ voltage profiles for the version of FIG. 15 are substantially the same as the voltage profiles for the version of FIG. 9. Thus, the version of FIG. 14 is particularly useful for resolving ambiguities and for making movement direction determinations, and the version of FIG. 15 is particularly useful in making position determinations when one of the brushes is located at one of the non-conductive regions 220. In addition, the versions of FIGS. 14 and 15 are advantageous in their reduced power requirements.

Figure 16:
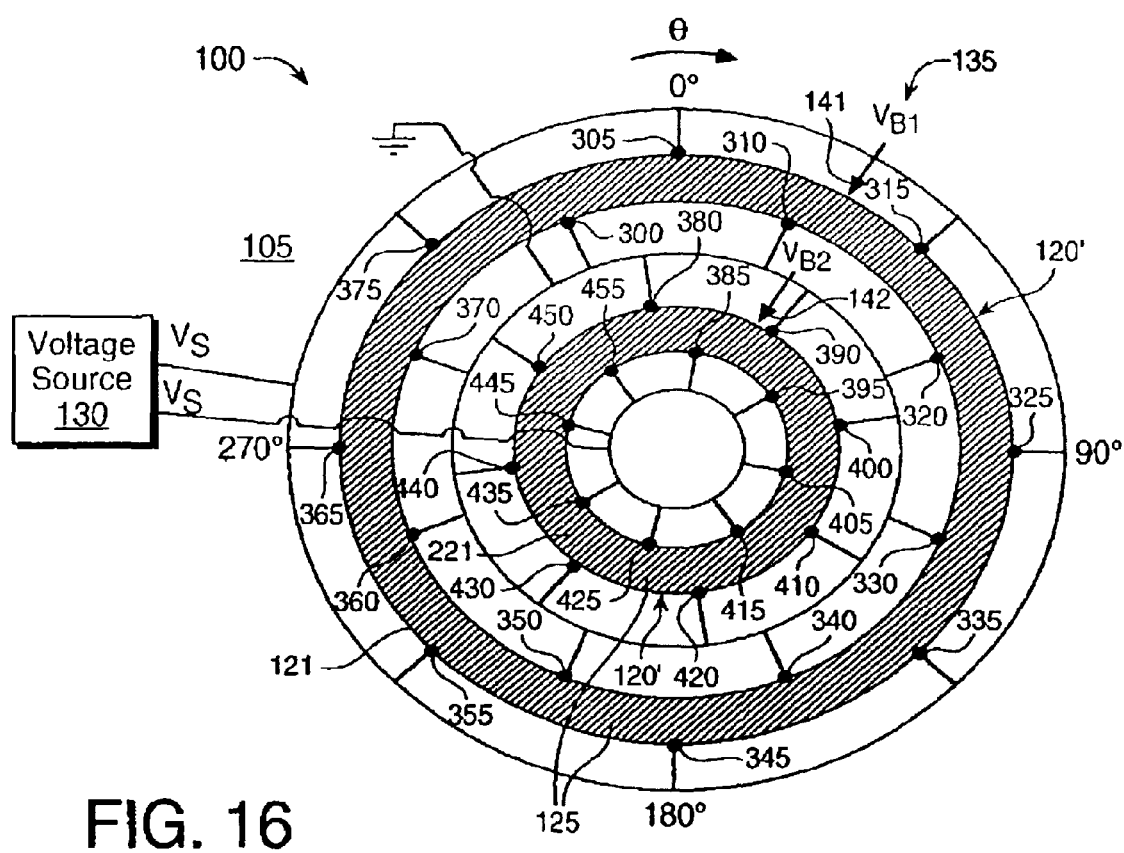
FIG. 16 is a schematic view of a rotary position sensor.
Figure 17:
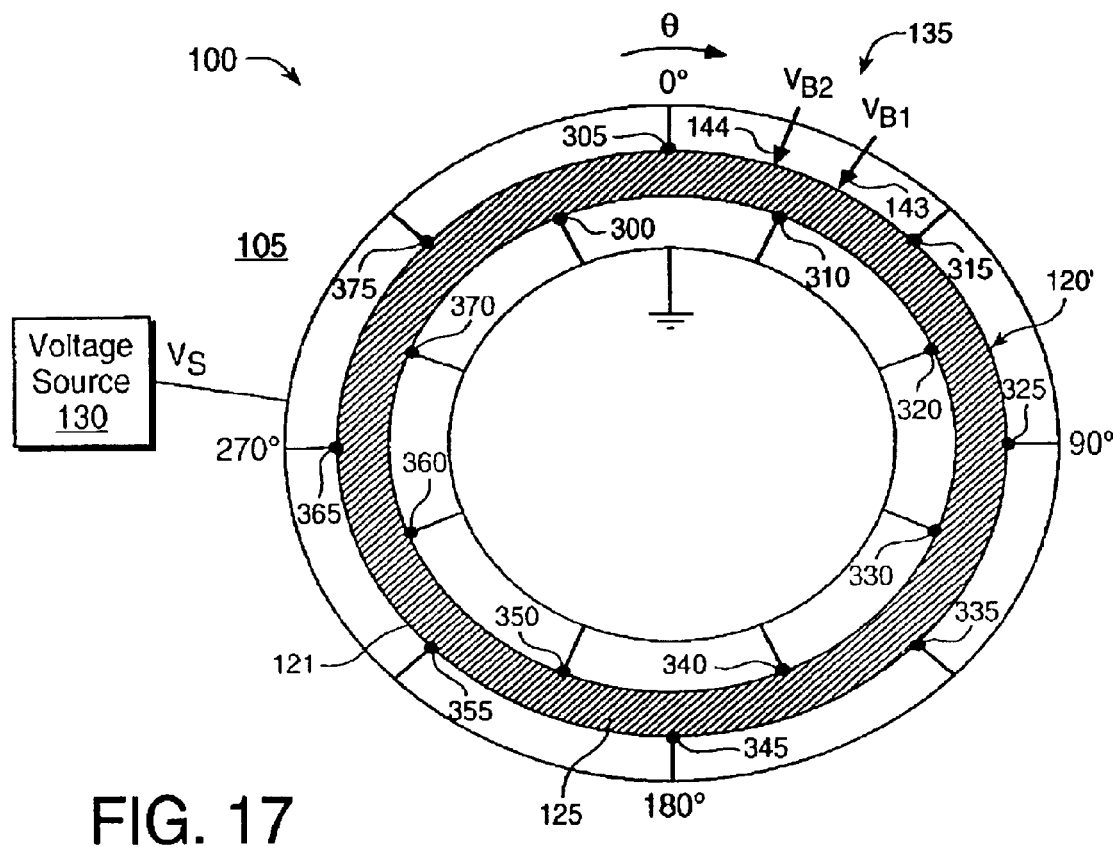
FIG. 17 is a schematic view of another version of a rotary position sensor.
Figure 18:
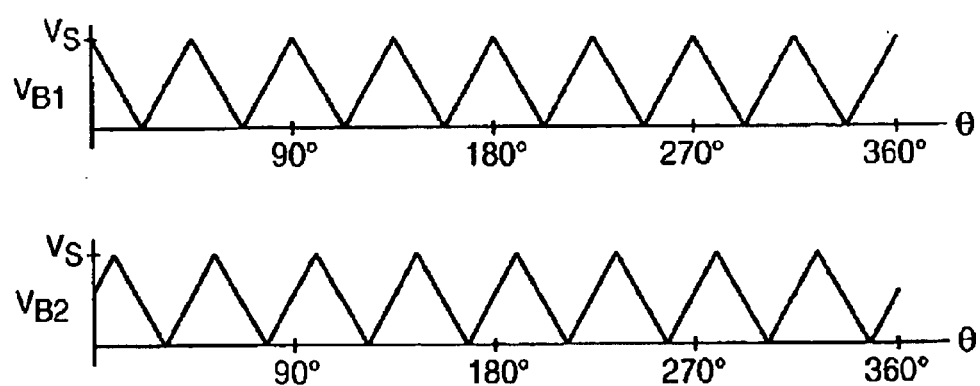
FIG. 18 is a graph showing a voltage profile for the position sensor of FIG. 16 and the position sensor of FIG. 17.

The position sensor 100 may also be used to detect the angular position of two relatively rotatable surfaces, such as a shaft that rotates relative to another surface. Each of the versions of the position sensor 100 discussed above may be modified to detect angular position. For example, the position sensor 100 of FIG. 16 is rotationally analogous to the linear version of the position sensor shown in FIG. 8. The version of FIG. 16 comprises two resistive elements 120' having different diameters. The outer resistive element 120' comprises grounded leads 300, 310, 320, 330, 340, 350, 360, 370 and voltage supplying leads 305, 315, 325, 335, 345, 355, 365, 375 that alternative with the grounded leads, as shown in FIG. 16. The inner resistive element 120' comprises grounded leads 380, 390, 400, 410, 420, 430, 440, 450 and voltage supplying leads 385, 395, 405, 415, 425, 435, 445, 455. The inner leads are offset from corresponding leads on the outer resistive element 120' so as to produce a $V_{B2}$ signal that is 90 degrees out of phase with the $V_{B1}$ signal, as discussed above in connection with FIG. 8. The physical offset angle depends on the number of leads provided. For example, in the version shown, eight voltage supplying leads and eight grounded leads are provided. Thus, a $V_{B1}$ cycle occurs for every 45 degrees of rotation. Accordingly, the leads of the inner element are shifted about 11.25 degrees relative to the outer leads. As a result, the $V_{B1}$ and $V_{B2}$ profiles shown in FIG. 18 may be produced. The same $V_{B1}$ and $V_{B2}$ profiles can be produced by using a single resistive element 120' and having angularly offset brushes 143, 144, as shown in FIG. 17 which is a version analogous to the linear version of FIG. 14. Since the version of FIG. 17 also has eight grounded and eight voltage supplying leads, the brushes 143, 144 are also offset by about 11.25 degrees. Alternatively, the brushes 143, 144 may be offset by about 11.25+n*45 degrees, where n equals an integer, to produce the voltage profile shown in FIG. 18. Offsets other than about 11.25 degrees, i.e. phase shifts of other than about 90 degrees, may alternatively be used.

Figure 19:
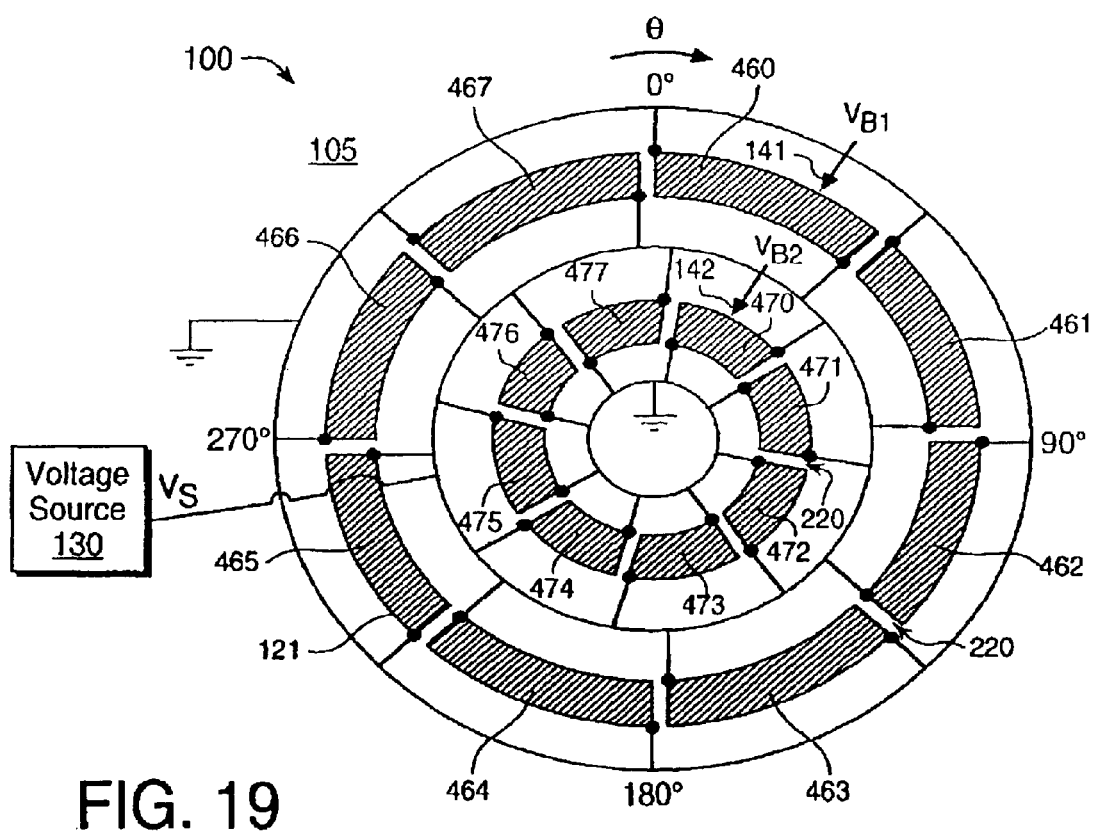
FIG. 19 is a schematic view of another version of a rotary position sensor.
Figure 20:
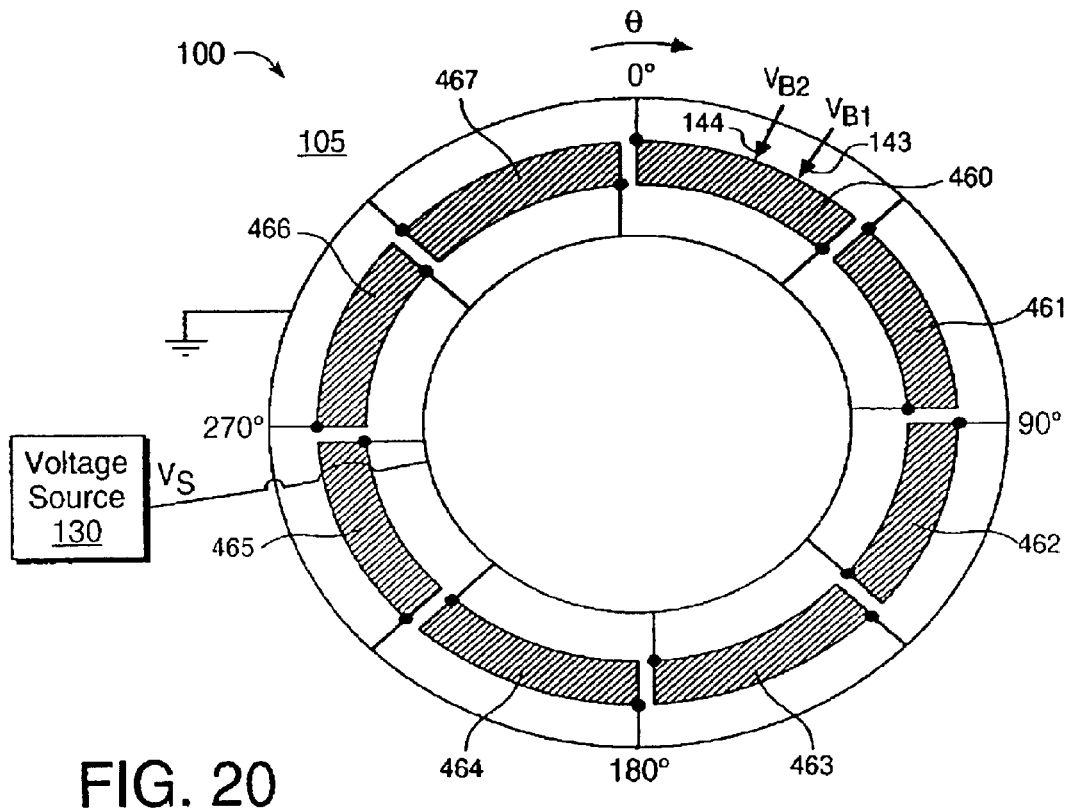
FIG. 20 is a schematic view of another version of a rotary position sensor.
Figure 21:
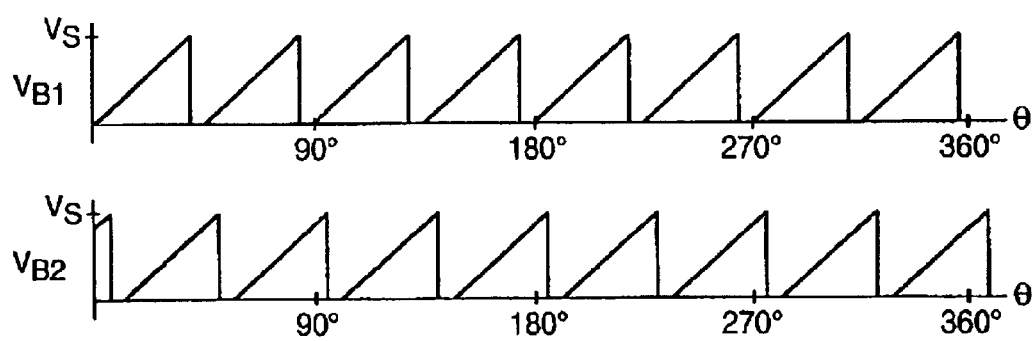
FIG. 21 is a graph showing a voltage profile for the position sensor of FIG. 19 and the position sensor of FIG. 20.

Similarly, FIGS. 19 and 20 show angular rotation sensing versions of the linear position sensors shown in FIGS. 9 and 15, respectively. In the version of FIG. 19, the position sensor 100 comprises an outer resistive element 120" comprising a plurality of resistive strips 460–467 and an inner resistive element 120" each comprising a plurality of resistive strips 470–477. Each resistive strip has one end connected to ground and another end connected to a voltage source 130. Adjacent resistive strips are separated by a non-conducting portion 220. The inner strips are offset relative to the outer strips so that there is no overlap between non-conducting portions 220. The resulting $V_{B1}$ and $V_{B2}$ profiles are shown in FIG. 21. The same $V_{B1}$ and $V_{B2}$ profiles are obtainable from the version of FIG. 20 where the inner resistive element 120" is replaced by an offset first and second brush arrangement 143, 144.

The position sensor 100 of the present invention is particularly advantageous for use with computer interface devices. Conventional low cost position sensors have less sensing accuracy than is desired for many interface application. For example, often interface devices require a very high sensing resolution to constantly update the velocity and/or position of a user manipulated object. For realistic and consistent forces to be output, a sensing resolution is needed that is greater than the typical mass-produced quadrature encoder can provide. However, to keep the costs of such interface devices viable for a consumer market, the position sensor must be relatively inexpensive. To provide the desired resolution, quadrature encoders having the desired increased resolution are typically too expensive to allow the computer interface device to be viably priced in the consumer market. Accordingly, in one version, the position sensor 100 of the present invention is used to detect user controlled position in an interface device.

Figure 22:
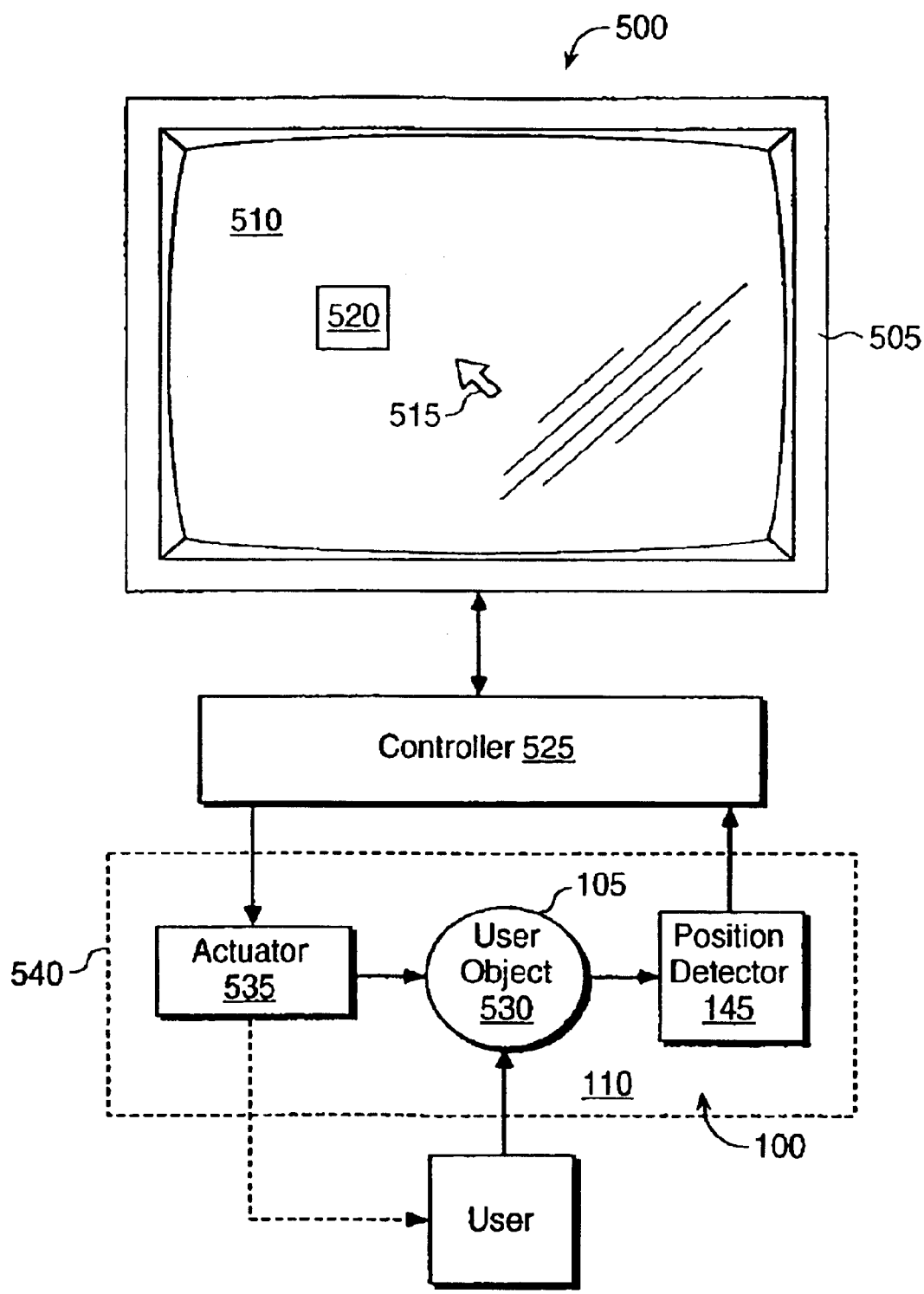
FIG. 22 is a schematic view of a user interactive system having an interface device with a position sensor according to the present invention.

FIG. 22 is a schematic illustration of a user interactive system 500 according to the invention. A display 505 provides a graphical environment 510 to a user. Within the graphical environment 510 is a graphical image 515. The graphical image 515 may be, for example, a cursor or other graphical object, the position, movement, and/or shape of which is controllable. For example, the graphical image 515 may be a pointer cursor, a character in a game, a surgical instrument, a view from the end of a surgical instrument, a representative portion of the user, or the like. Also within the graphical environment is a graphical object 120 such as an icon, as shown, or any other graphical representation including another graphical image that may be controlled by the user or by another user. A controller 525 in communication with the display 505 is capable of generating and/or controlling the graphical environment 510, for example by executing program code including an application program. A user object 530 is manipulatable by a user, and the manipulation of the user object 530 controls the position, orientation, shape and/or other characteristic of the graphical image 515 within the graphical environment 510, for example by directly correlating a position of the user object 530 with a displayed position of the graphical image 515 or by correlating a position of the user object 530 with a rate of movement of the graphical image 515. Either the entire user object 530 may be manipulatable by the user or a portion of the user object 530 may be manipulatable relative to another portion of the user object 530. For example, the user object may be a surface that is engaged by one or more hands of a user, such as a joystick, a mouse, a mouse housing, a stylus, a knob, an elongated rigid or flexible member, an instrumented glove, or the like and may be moveable in from one to six degrees of freedom. The user object 130 includes a surface 105 that may be moved relative to another surface 110. The relative movement is sensed by the position sensor 100 as discussed above.

Optionally, haptic feedback may be provided to the user to increase the realism of the interaction within the graphical environment 510. For example, when a predetermined event occurs within the graphical environment 510, such as an interaction of the graphical image 515 with the graphical object 520, the controller 525 may cause an actuator 535 to output a haptic sensation to the user. In the version shown, the actuator 535 outputs the haptic sensation to the user object 530 through which the sensation is provided to the user. The actuator 535 and the user object 530 may be part of a haptic interface device 540. The actuator 535 may be positioned in the haptic interface device 540 to apply a force to the user object 530 or to a portion of the user object. For example, the haptic interface device 540 may comprise a user object 530, such as a mouse housing, having an actuator 535 within the user object 530, such as a vibrating motor within the mouse housing, or the haptic interface device may comprise a user object 530, such as a mouse, that is mechanically linked to an actuator 535. Alternatively, the actuator 535 and the user object 530 may be separate structures, and the actuator 535 may provide a haptic sensation directly to the user, as shown by the phantom arrow in FIG. 22.

The actuator 535 may provide the haptic sensation actively or passively. For example, the actuator 535 may comprise one or more motors coupled to the user object 530 to apply a force to the user or to the user object 530 in one or more degrees of freedom. Alternatively or additionally, the actuator 535 may comprise one or more braking mechanisms coupled to the user object to inhibit movement of the user or the user object 530 in one or more degrees of freedom. By haptic sensation it is meant any sensation provided to the user that is related to the user's sense of touch. For example, the haptic sensation may comprise kinesthetic force feedback and/or tactile feedback. By kinesthetic force feedback it is meant any active or passive force applied to the user to simulate a force that would be experienced in the graphical environment 510, such as a grounded force applied to the user or the user object 530 to simulate a force experienced by at least a portion of the graphical image 515. For example, if the graphical image 515 is positioned against a surface, a barrier or an obstruction, the actuator 535 may output a force against the user object 530 preventing or retarding movement of the user or the user object 530 in the direction of the barrier or obstruction. By tactile feedback it is meant any active or passive force applied to the user to provide the user with a tactile indication of a predetermined occurrence within the graphical environment 510. For example, a vibration, click, pop, or the like may be output to the user when the graphical image 515 interacts with a graphical object 520. Additionally, tactile feedback may comprise a tactile sensation applied to approximate or give the illusion of a kinesthetic force. For example, by varying the frequency and/or the amplitude of an applied vibration, variations in surface textures of different graphical objects can be simulated or by providing a series of clicks when a graphical image penetrates an object, resistance to the penetration can be simulated. For example, in one version a kinesthetic force sensation, such as a spring force, may be applied to the user whenever the graphical image 515 engages the graphical object 520 to simulate a selectively deformable surface. Alternatively or additionally, a tactile sensation, such as a pop, may be applied to the user when the graphical image 515 is moved across a surface of the graphical object 520 to simulate a texture of the graphical object 520.

The controller 525 may be a computer, or the like. In one version, the controller 525 may comprise a processor and may be able to execute program code. For example, the controller 525 may be a personal computer or workstation, such as a PC compatible computer or Macintosh personal computer, or a Sun or Silicon Graphics workstation. The computer may be operable under the Windows™, MacOS, Unix, or MS-DOS operating system or similar. Alternatively, the controller 525 can be one of a variety of home video game console systems commonly connected to a television set or other display, such as systems available from Nintendo, Sega, Sony, and Microsoft. In other embodiments, the controller 525 can be a "set top box" which can be used, for example, to provide interactive television functions to users, or a "network-" or "internet-computer" which allows users to interact with a local or global network using standard connections and protocols such as used for the Internet and World Wide Web. The controller 525 may include a host microprocessor, random access memory (RAM), read only memory (ROM), input/output (I/O) circuitry, and/or other components of computers well-known to those skilled in the art. The controller 525 may implement an application program with which a user is interacting via peripherals, such as haptic interface device 540 and/or user object 530. For example, the application program can be a simulation program, such as an interactive digital mockup of a designed feature, a medical procedure simulation program, a game, etc. Specifically, the application program may be a computer aided design or other graphic design program, an operating system, a video game, a word processor or spreadsheet, a Web page or browser that implements, for example, HTML or VRML instructions, a scientific analysis program, or other application program that may or may not utilize haptic feedback. Herein, operating systems such as Windows™, MS-DOS, MacOS, Linux, Be, etc. are also referred to as "application programs." The application program may comprise an interactive graphical environment, such as a graphical user interface (GUI) to allow the user to input information to the program. Typically, the application provides images to be displayed on a display screen and/or outputs other feedback, such as auditory signals. The controller 525 is capable of generating a graphical environment 510, which can be a graphical user interface, game, simulation, such as those described above, or other visual environment. The controller 525 displays graphical objects 520, such as graphical representations and graphical images, or "computer objects," which are not physical objects, but are logical software unit collections of data and/or procedures that may be displayed as images by the computer on display screen, as is well known to those skilled in the art. The application program checks for input signals received from the electronics and sensors of the user object 530, and outputs force values and/or commands to be converted into haptic output for the actuator 535. Suitable software drivers which interface such simulation software with computer input/output (I/O) devices are available from Immersion Corporation of San Jose, Calif. Display screen can be included in the computer and can be a standard display screen (LCD, CRT, flat panel, etc.), 3-D goggles, or any other visual output device.

Figure 23:
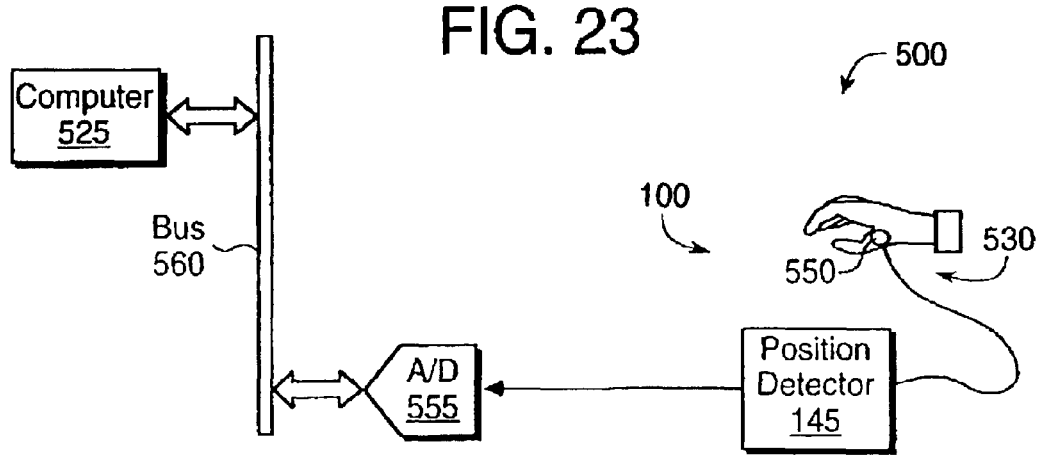
FIG. 23 is a schematic view of a system having a goniometer having a position sensor.

The user interactive system 500 may be any one of a variety of systems. In one version of the user interactive system 500, the user object 530 comprises a goniometer 550 capable of sensing angular rotation of a joint on a body, as shown in FIG. 23. For example the goniometer 550 may comprise a first surface fixed to a link on one side of the joint and a second surface fixed to a link on the other side of the joint. A position sensor 100 may be positioned to sense the relative movement of the surfaces and thereby detect the angular rotation of the joint. The goniometer may be used to diagnostically and/or anatomically study the movements of the joint. Alternatively or additionally, the movement of the joint may be used to interact with a simulation system, such as disclosed in U.S. Pat. No. 6,110,130 which is incorporated herein by reference in its entirety. A signal indicative of the detected manipulation is provided to the computer 525, via the position detector 145, to control the position, orientation, and/or shape of the graphical image 115, which may be for example a graphical hand 170. As shown in FIG. 23, an analog to digital converter 555 may converts the signal from the position detector 145 to a digital signal that may be provided to the computer 525 through bus 560. In another version, the position sensor 100 may be used to detect the rotational position of a knob, such as a knob disclosed in U.S. Pat. No. 5,889,672 which is incorporated herein by reference in its entirety. In other versions, the position sensor 100 may be used to detect manipulation of a mouse, such as the mouse disclosed in U.S. Pat. No. 6,100,874 or in U.S. Pat. No. 6,211,861, both of which are incorporated herein by reference in their entireties, or of a scroll wheel of a mouse. The sensed manipulation by the user may also or alternatively be used to the operation of physical devices, such as a slave device in robotics. For example, in one version, the position of a user's hand may be sensed by a position sensor 100 may be used to control an anthropomorphic robot hand or the like.

Figure 24:
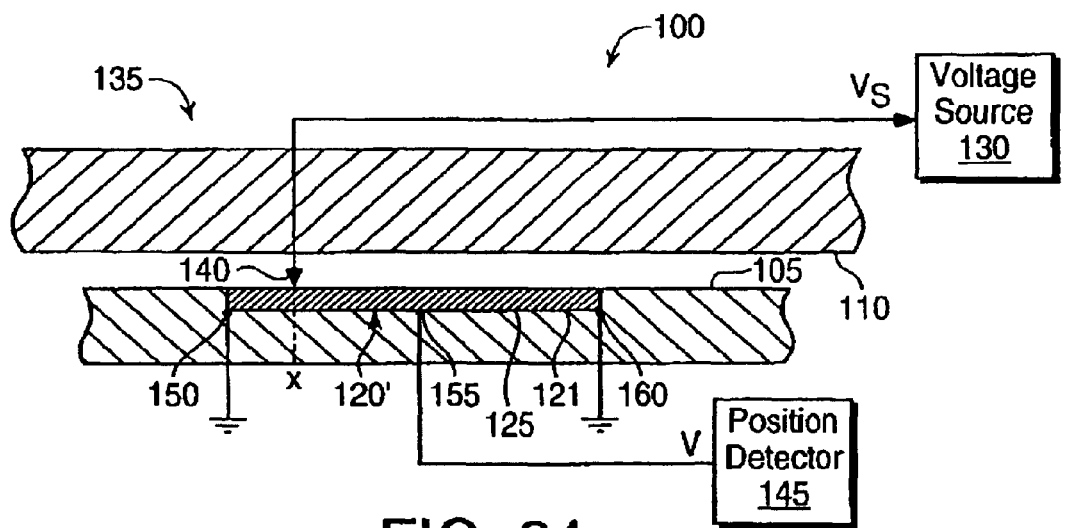
FIG. 24 is a schematic sectional side view of another version of a position sensor.
Figure 25:
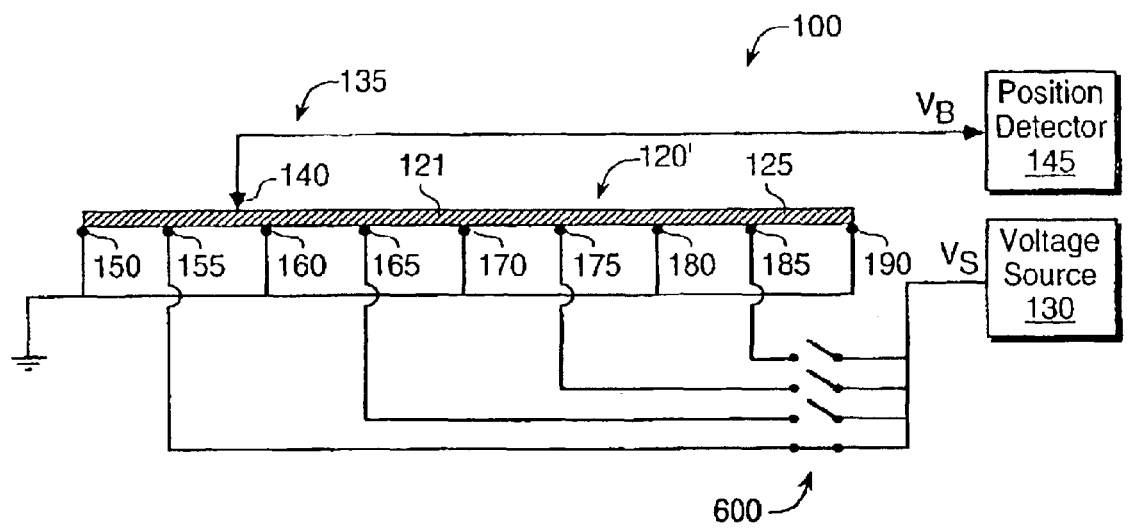
FIG. 25 is a schematic view of a version of a position sensor having a voltage controller.

In other versions of the invention, the voltage supply configurations of the above-described embodiments may be varied. For example, instead of being grounded, the leads shown as being grounded may be connected to a voltage supply that provides a voltage different than $V_s$, such as negative $V_s$. Alternatively, different values of $V_s$ may be provided for each cycle. Also, the voltage may be provided to the contact element 135 rather than to the resistive element 120. For example, FIG. 24 shows a version of a position sensor 100 similar to the version of FIG. 2, but with the voltage supply being connected to the brush 140. The resulting voltage profile of the version of FIG. 24 is similar to that shown in FIG. 2a. The voltage may be supplied to the contact element 135 in the other described versions as well. In another version, the voltage may be supplied to portions of the position sensor 100 in order to reduce the power consumption of the position sensor 100. For example, in the version of FIG. 25, a voltage controller such as a power commuting mechanism 600 may be provided to regulate the provision of the voltage from the voltage supply 130. In the version shown the power commuting mechanism may comprise electrical switches or the like that provide the voltage, $V_s$, to the portion of the position sensor 100 where it is needed. The power commuting mechanism 600 may be under the control of the controller 525 or a separate controller, such as a local controller in the interface device. In one version, the power commuting mechanism 600 is adapted to provide substantially no power to at least one portion of the resistive element, for example, by not powering the portion of the resistive element 120 which is furthest from the contact element 135. In a rotation version, the portion furthest from the contact element 135 may be considered to be the portion diametrically opposite to the portion being contacted by the contact element 135. In another version, the power commuting mechanism 600 may be adapted to provide power substantially only to the portion of the resistive element 120 being contacted by the contact element 135 at a particular time, as shown in the version of FIG. 25.

While this invention has been described in terms of several preferred embodiments, it is contemplated that alterations, permutations and equivalents thereof will become apparent to those skilled in the art upon a reading of the specification and study of the drawings. Also, more or less than eight, such as two or four, of each type of lead may be provided for the rotational embodiments. In addition, the resistive element 120 may be an arc less than an entire circle to sense a portion of an angular rotation. Furthermore, certain terminology, such as terms like x, y, z, left, right, up, down, etc., has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. An apparatus, comprising:
   a resistive element positionable on a first surface, the resistive element formed from a plurality or portions;
   a plurality of leads configured to provide a voltage to each of the plurality of portions of the resistive element;
   a contact element positionable on a second surface, the contact element configured to contact the resistive element to detect a voltage at a contact position, the detected voltage being associated with a position of the second surface relative to the first surface; and
   a voltage controller configured to selectively provide a voltage to each of the plurality of portions of the resistive element according to a position of the contact element relative to the resistive element.

2. The apparatus of claim 1, wherein the voltage controller includes a plurality of electrical switches.

3. The apparatus of claim 1, wherein the voltage controller is configured to provide substantially no power to at least one portion of the resistive element for at least a time period.

4. The apparatus of claim 1, wherein the voltage controller is configured to provide power substantially only to the portion of the resistive element being contacted by the contact element.

5. An apparatus, comprising:
   a resistive element positionable on a first surface;
   a pair of leads electrically connected to the resistive element, the pair of leads configured to supply a first voltage;
   a contact element positionable on a second surface, the contact element configured to contact at least a portion of the resistive element and to provide a second voltage to the resistive element; and
   an intermediate lead electrically connected to the resistive element between the pair of leads, the intermediate lead configured to detect a voltage, the detected voltage being associated with a position of the second surface relative to the first surface.

6. The apparatus of claim 5, wherein the pair of leads are electrically connected to ground and the contact element provides the second voltage from a voltage supply.

7. The apparatus of claim 5, further comprising a second resistive element positionable on the first surface.

8. An apparatus, comprising:
   a manipulandum configured to be in communication with a computer, the manipulandum being configured to control a graphical object associated with an application, the application being associated with the computer; and
   a sensor having a resistive element on a first surface and a contact element on a second surface, the resistive element being electrically connected to a first plurality of leads configured to provide a first voltage, the resistive element being electrically connected to a second plurality of leads at locations intermediate to the first plurality of leads configured to provide a second voltage, the contact element being configured to contact at least a portion of the resistive element to detect a voltage at a contact position, the detected voltage being associated with a manipulation of the manipulandum and control of the graphical object.

9. The apparatus of claim 8, further comprising an actuator adapted to provide a haptic output in relation to an interaction between a graphical image displayed on the computer and the graphical object.

10. The apparatus of claim 8, wherein the detected voltage is configured to control a slave device.

* * * * *